US011496227B2

(12) United States Patent
Shiota et al.

(10) Patent No.: US 11,496,227 B2
(45) Date of Patent: Nov. 8, 2022

(54) ELECTRONIC COMPONENT HANDLING APPARATUS, ELECTRONIC COMPONENT TESTING APPARATUS, AND SOCKET

(71) Applicant: ADVANTEST Corporation, Tokyo (JP)

(72) Inventors: Natsuki Shiota, Tokyo (JP); Aritomo Kikuchi, Tokyo (JP)

(73) Assignee: ADVANTEST Corporation, Tokyo (JP)

( * ) Notice: Subject to any disclaimer, the term of this patent is extended or adjusted under 35 U.S.C. 154(b) by 30 days.

(21) Appl. No.: 17/107,022

(22) Filed: Nov. 30, 2020

(65) Prior Publication Data

US 2021/0194601 A1 Jun. 24, 2021

(30) Foreign Application Priority Data

Dec. 24, 2019 (JP) .............................. JP2019-232544

(51) Int. Cl.
*H04B 17/10* (2015.01)
*H04B 17/14* (2015.01)
*H04B 17/12* (2015.01)
*H04B 5/00* (2006.01)

(52) U.S. Cl.
CPC ......... *H04B 17/102* (2015.01); *H04B 5/0043* (2013.01); *H04B 17/12* (2015.01); *H04B 17/14* (2015.01)

(58) Field of Classification Search
CPC .................................................. H04B 17/102
See application file for complete search history.

(56) References Cited

U.S. PATENT DOCUMENTS

| 8,811,461 | B1 | 8/2014 | Huynh | |
|---|---|---|---|---|
| 2001/0023178 | A1* | 9/2001 | Amano | ................... H01Q 1/244 343/702 |
| 2003/0095076 | A1* | 5/2003 | Lee | ........................ H01Q 19/10 343/837 |
| 2006/0194553 | A1 | 8/2006 | Ozaki et al. | |
| 2007/0243826 | A1 | 10/2007 | Liu | |
| 2010/0273433 | A1 | 10/2010 | Ozaki et al. | |
| 2013/0231060 | A1 | 9/2013 | Ozaki et al. | |
| 2014/0266929 | A1 | 9/2014 | Huynh et al. | |

(Continued)

FOREIGN PATENT DOCUMENTS

| JP | 2007-294758 A | 11/2007 |
|---|---|---|
| JP | 2008-518567 A | 5/2008 |

(Continued)

OTHER PUBLICATIONS

Office Action issued in the counterpart Taiwanese Patent Application No. 109140055, dated Jun. 2, 2021 (6 pages).

(Continued)

*Primary Examiner* — Hsinchun Liao
(74) *Attorney, Agent, or Firm* — Osha Bergman Watanabe & Burton LLP

(57) ABSTRACT

An electronic component handling apparatus includes: a moving device that moves a device under test (DUT) including a first antenna and presses the DUT against a socket. The moving device includes a holder that holds the DUT and a second antenna that receives a radio wave radiated from the first antenna or that radiates the radio wave to the first antenna.

12 Claims, 15 Drawing Sheets

(56) References Cited

U.S. PATENT DOCUMENTS

| | | |
|---|---|---|
| 2014/0266930 A1 | 9/2014 | Huynh |
| 2014/0269365 A1 | 9/2014 | Olgaard et al. |
| 2014/0269871 A1 | 9/2014 | Huynh |
| 2014/0273873 A1 | 9/2014 | Huynh |
| 2018/0299488 A1* | 10/2018 | Jordan .................... H01Q 1/38 |
| 2019/0162767 A1 | 5/2019 | Wang et al. |
| 2019/0162774 A1 | 5/2019 | Huang et al. |
| 2019/0310314 A1 | 10/2019 | Liu et al. |

FOREIGN PATENT DOCUMENTS

| | | |
|---|---|---|
| JP | 2016-516344 A | 6/2016 |
| JP | 2019-101016 A | 6/2019 |
| TW | I625045 B | 5/2018 |
| TW | 201944082 A | 11/2019 |

OTHER PUBLICATIONS

Office Action issued in the counterpart Taiwanese Patent Application No. 109140055, dated Feb. 23, 2022 (4 pages).

\* cited by examiner

ELECTRONIC COMPONENT HANDLING APPARATUS, ELECTRONIC COMPONENT TESTING APPARATUS, AND SOCKET

CROSS-REFERENCE TO RELATED APPLICATIONS

This application claims priority from Japanese Patent Application No. 2019-232544 filed on Dec. 24, 2019, the contents of which are incorporated herein by reference in its entirety.

BACKGROUND

Technical Field

The present invention relates to the electronic component handling apparatus used in the test of the electronic component under test (DUT: Device Under Test) having an antenna, an electronic component testing apparatus, and a socket.

Description of the Related Art

As a method of determining the radiation performance characteristics of a wireless device, measuring a signal from the wireless device attached to an attachment mechanism in a far-field anechoic chamber (OTA (Over the Air) test) is known (for example, see Patent Document 1).

PATENT DOCUMENT

Patent Document 1: JP 2008-518567 A

As the OTA test of wireless devices, a test in near-field may be performed instead of the test in far-field as described above.

SUMMARY

One or more embodiments of the present invention provide an electronic component handling apparatus, an electronic component testing apparatus, and a socket capable of performing an OTA test in a near-field.

[1] One or more embodiments of the present invention provide an electronic component handling apparatus including a moving device that is configured to move a DUT having a first antenna and press the DUT against a socket. The moving device includes a holding portion (i.e., holder) to hold the DUT. The holding portion includes a second antenna to receive a radio wave radiated from the first antenna or radiate a radio wave to the first antenna.

[2] In one or more embodiments, the holding portion may include an attenuation member (i.e., attenuation plate) interposed between the first antenna and the second antenna for attenuating radio waves radiated from the first or second antenna.

[3] In one or more embodiments, the second antenna may include a radiating element that receives a radio wave radiated from the first antenna or radiates a radio wave to the first antenna. The holding portion may include a tubular portion that has an opening facing the DUT and surrounds the radiating element. The attenuation member is provided inside the tubular portion to face the radiating element.

[4] In one or more embodiments, the second antenna may include a radiating element that receives a radio wave radiated from the first antenna or radiates a radio wave to the first antenna. The holding portion may include a body and a tubular portion attached to the body and having an opening facing the DUT. The radiating element may be provided in a concavity formed in the body. The attenuation member may be provided in the concavity of the body to face the radiating element. The tubular portion may be attached to the body to surround the concavity.

[5] In one or more embodiments, the tubular portion may be configured to contact the DUT to surround the first antenna.

[6] In one or more embodiments, the holding portion may include a first connector connected to the second antenna to transmit a radio wave or an electrical signal to the second antenna. The first connector may be configured to be connected to a second connector of the tester in accordance with pressing the DUT against the socket by the moving device.

[7] In one or more embodiments, the holding portion may include a detector interposed between the second antenna and the first connector, configured to convert an RF signal into a DC signal.

[8] In one or more embodiments, the second antenna may be a patch antenna that includes a substrate, a radiating element provided on the substrate, and a wiring pattern provided on the substrate and connected to the radiating element.

[9] In one or more embodiments, the second antenna may include a plurality of the radiating elements provided in a matrix on the substrate. The wiring pattern may be connected to the plurality of radiating elements.

[10] In one or more embodiments, the second antenna may include a plurality of the radiating elements provided in a matrix on the substrate and a plurality of the wiring patterns respectively connected to the corresponding radiating elements.

[11] One or more embodiments of the present invention provide an electronic component testing apparatus including the electronic component handling apparatus described above and a tester including a test head to which the socket is mounted. The holding portion includes a first connector connected to the second antenna and configured to transmit a radio wave or an electrical signal. The tester includes a second connector configured to be connected to the first connector. The tester tests the DUT by transmitting and receiving the radio wave between the first and the second antennas in a state in which the DUT is electrically connected to the socket and the first and the second connectors are connected to each other.

[12] One or more embodiments of the present invention provide an electronic component testing apparatus including a tester including a tester body, a test head electrically connected to the tester body, and a socket mounted on the test head. The socket includes a socket body mounted on the test head including a contactor electrically connected to a DUT having a first antenna and a socket cover covering the socket body and pressing the DUT against the socket body. The socket cover includes a second antenna and a first connector. The second antenna is provided on a side opposite the socket body and receiving a radio wave radiated from the first antenna or radiating a radio wave to the first antenna. The first connector is connected to the second antenna and configured to transmit a radio wave or an electrical signal to the second antenna. The tester includes a second connector configured to be connected to the first connector. The tester tests the DUT by transmitting and receiving the radio wave between the first and second antennas in a state which the DUT is electrically connected to the socket and the first and the second connectors are connected to each other.

[13] One or more embodiments of the present invention provide a socket electrically connected to a DUT having a first antenna. The socket includes a socket body having a contactor electrically connected to the DUT and a socket cover covering the socket body and pressing the DUT against the socket body. The socket cover includes a second antenna provided on a side opposite the socket body and receiving a radio wave radiated from the first antenna or radiating a radio wave to the first antenna.

[14] In one or more embodiments, the socket cover may include an attenuation member interposed between the first antenna and the second antenna for attenuating the radio wave radiated from the first or second antenna.

[15] In one or more embodiments, the second antenna may include a radiating element that receives a radio wave radiated from the first antenna or radiates a radio wave to the first antenna. The socket cover may include a tubular portion having an opening facing the DUT and surrounding the radiating element. The tubular portion may be configured to contact the DUT to surround the first antenna. The attenuation member may be provided inside the tubular portion to face the radiating element.

[16] In one or more embodiments, the socket cover may include a first connector connected to the second antenna and configured to transmit a radio wave or an electrical signal to the second antenna. The first connector may be configured to be connected to a second connector of a tester in accordance with pressing the DUT against the socket by the socket cover.

[17] In one or more embodiments, the socket cover may be interposed between the second antenna and the first connector and may include a detector configured to convert an RF signal to a DC signal.

[18] In one or more embodiments, the second antenna may be a patch antenna that includes a substrate, a radiating element provided on the substrate, and a wiring pattern provided on the substrate and connected to the radiating element.

[19] In one or more embodiments, the second antenna may include a plurality of the radiating elements provided in a matrix on the substrate. The wiring pattern may be connected to the plurality of radiating elements.

[20] In one or more embodiments, the second antenna may include a plurality of the radiating elements provided in a matrix on the substrate and a plurality of the wiring patterns respectively connected to the corresponding radiating elements.

In one or more embodiments of the present invention, the holding portion of the electronic component handling apparatus includes the second antenna for receiving the radio wave radiated from the electronic component. This allows to perform the OTA test in a near-field.

DETAILED DESCRIPTION

Embodiments of the present invention will be described below with reference to the drawings.

The First Embodiment

Figure 1:
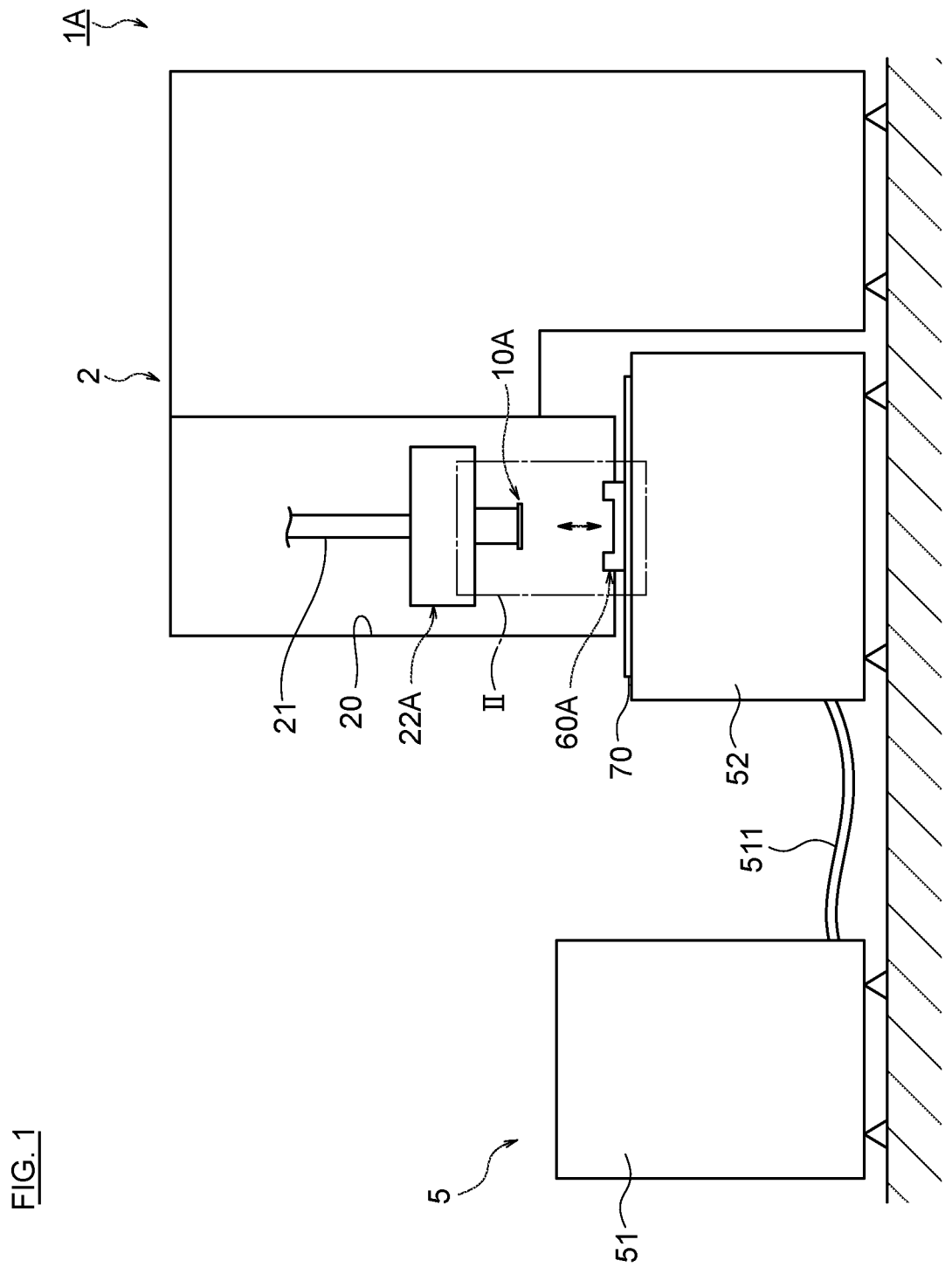
FIG. 1 is a schematic cross-sectional view showing an entire configuration of an electronic component testing apparatus according to the first embodiment of the present invention.
Figure 2:
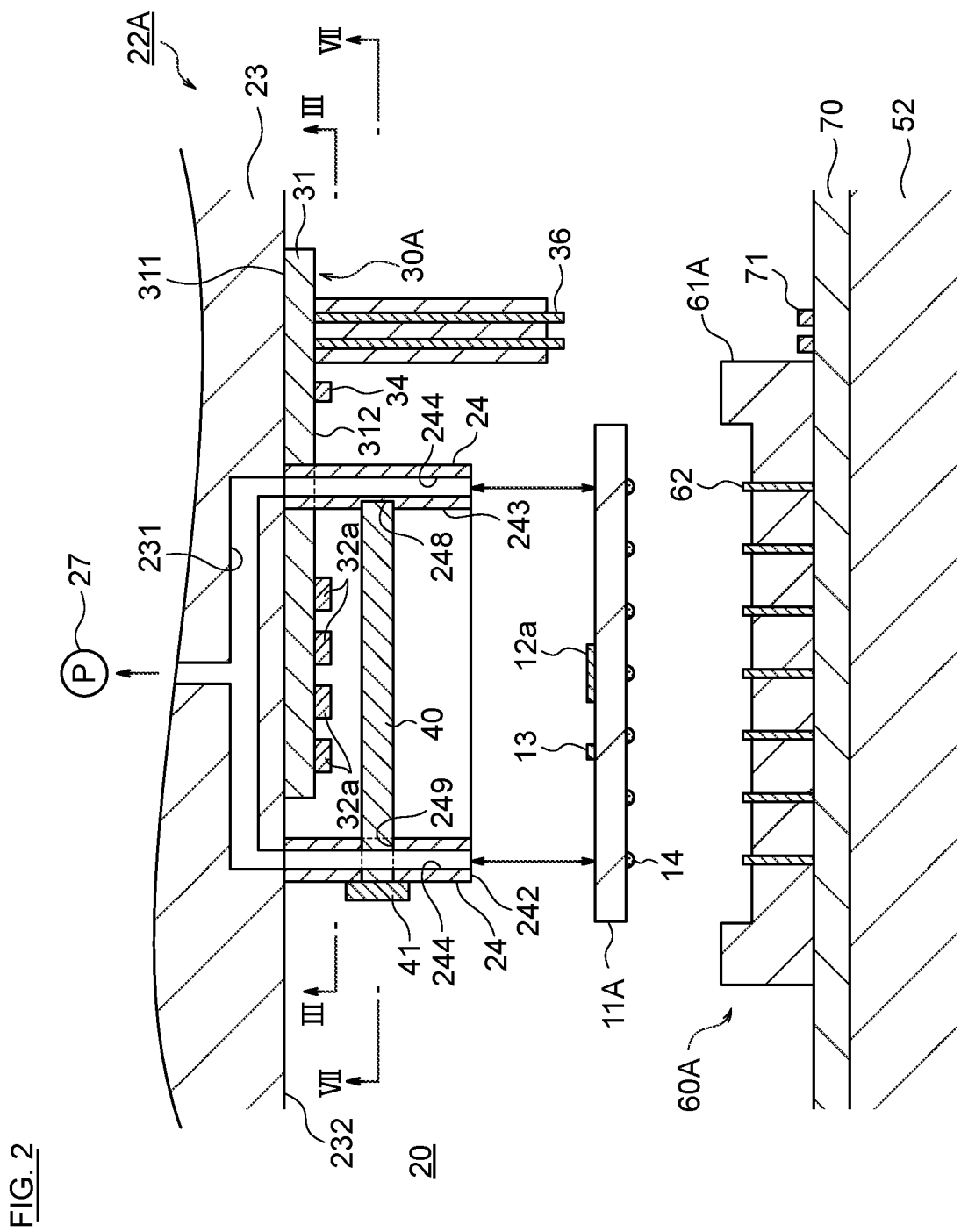
FIG. 2 is an enlarged cross-sectional view corresponding to a part II of FIG. 1, showing before pressing the DUT against the socket.
Figure 3:
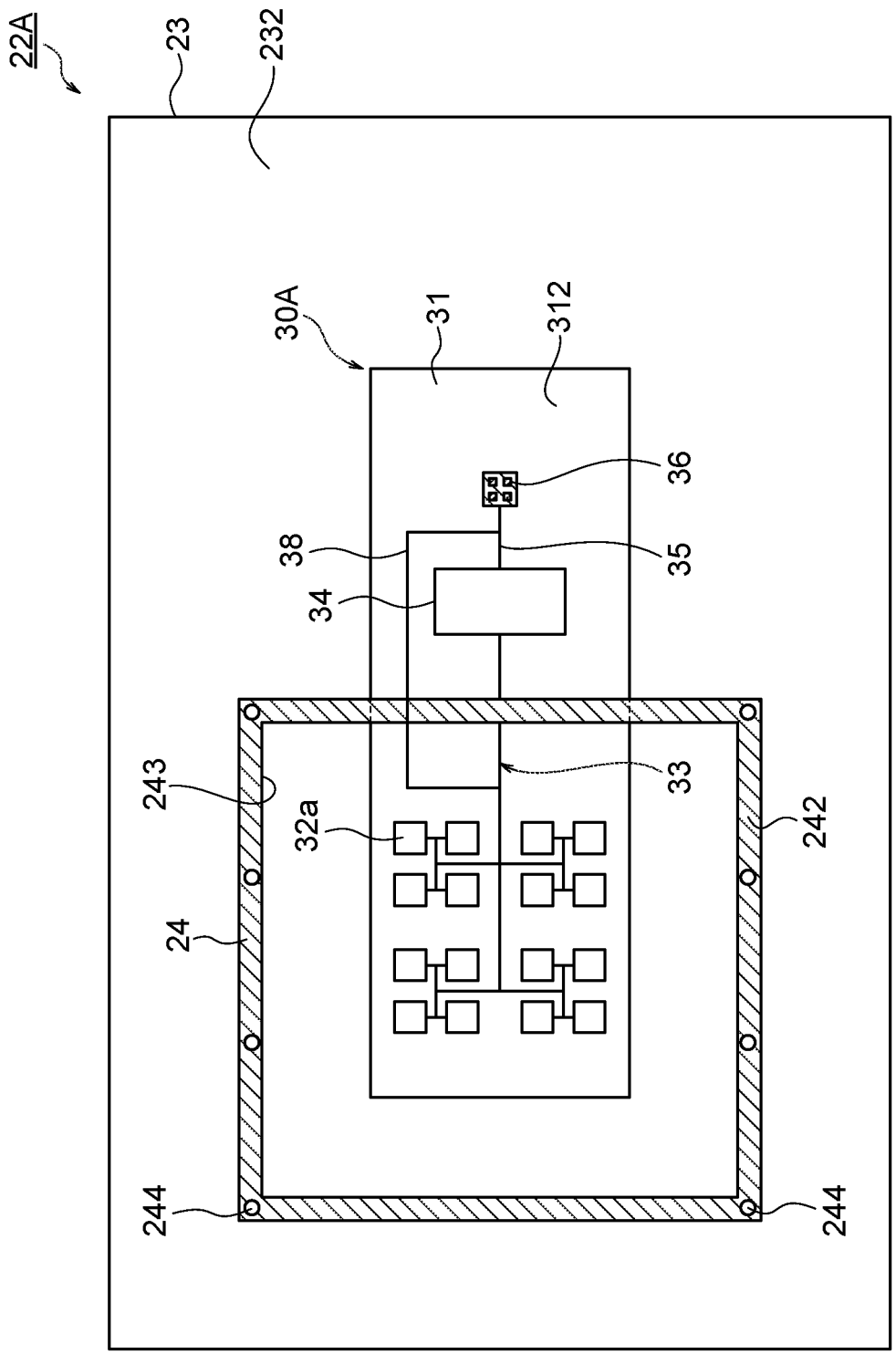
FIG. 3 is a cross-sectional view taken along line of FIG. 2.
Figure 4:
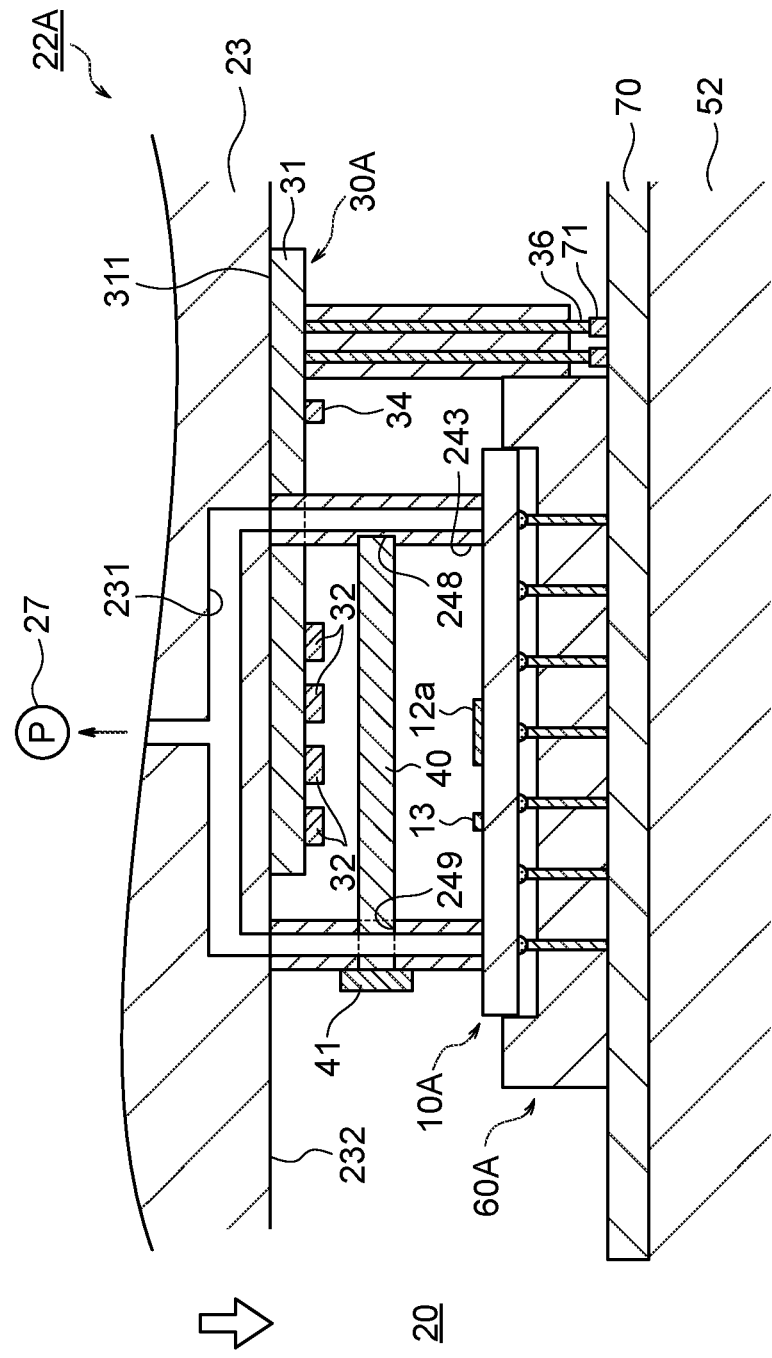
FIG. 4 is an enlarged sectional view corresponding to the part II of FIG.1 and is a diagram showing a state of pressing the DUT against the socket.
Figure 5:
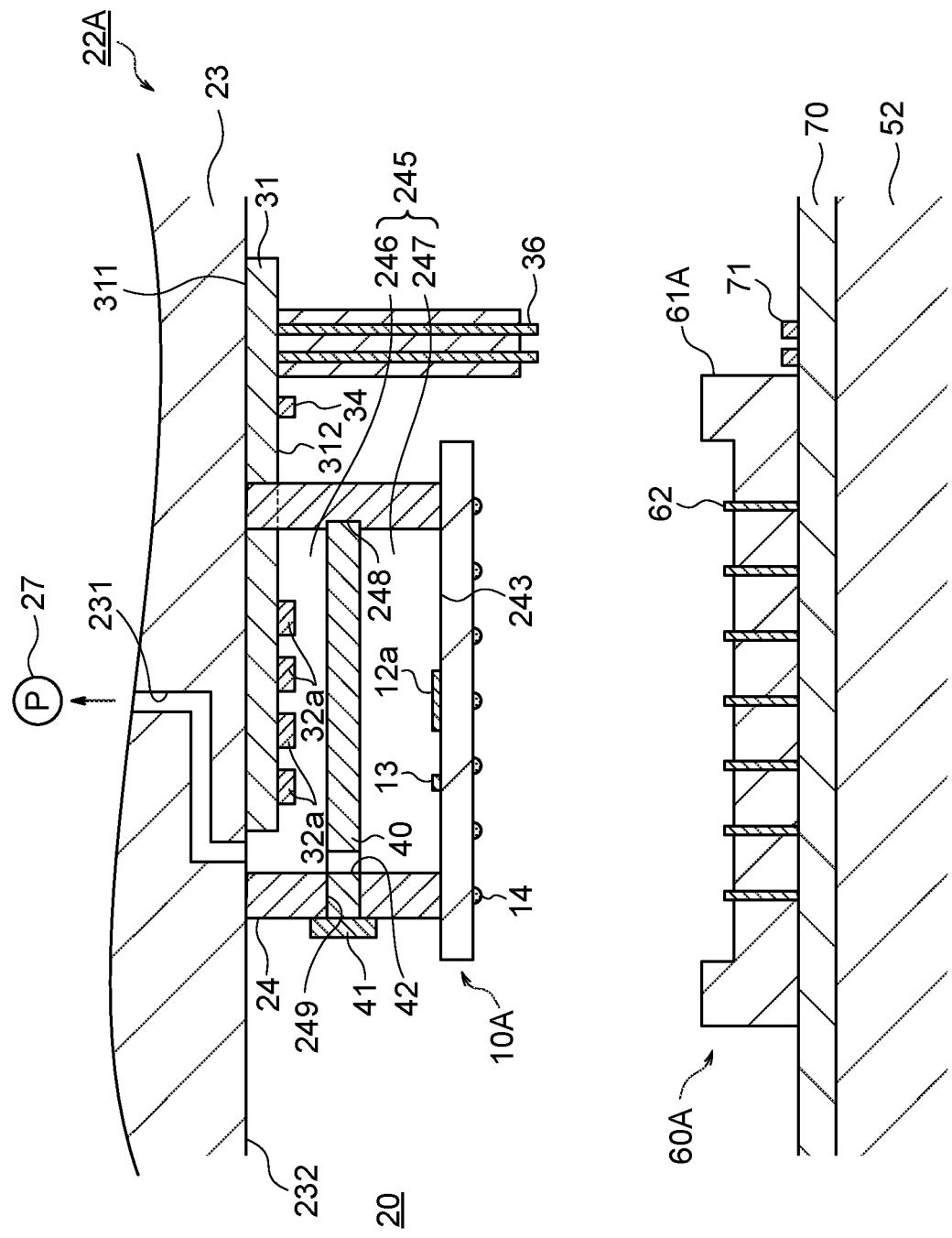
FIG. 5 is an enlarged cross-sectional view showing a first modification of the contact chuck in the first embodiment of the present invention, and is an enlarged cross-sectional view corresponding to FIG. 2.
Figure 6:
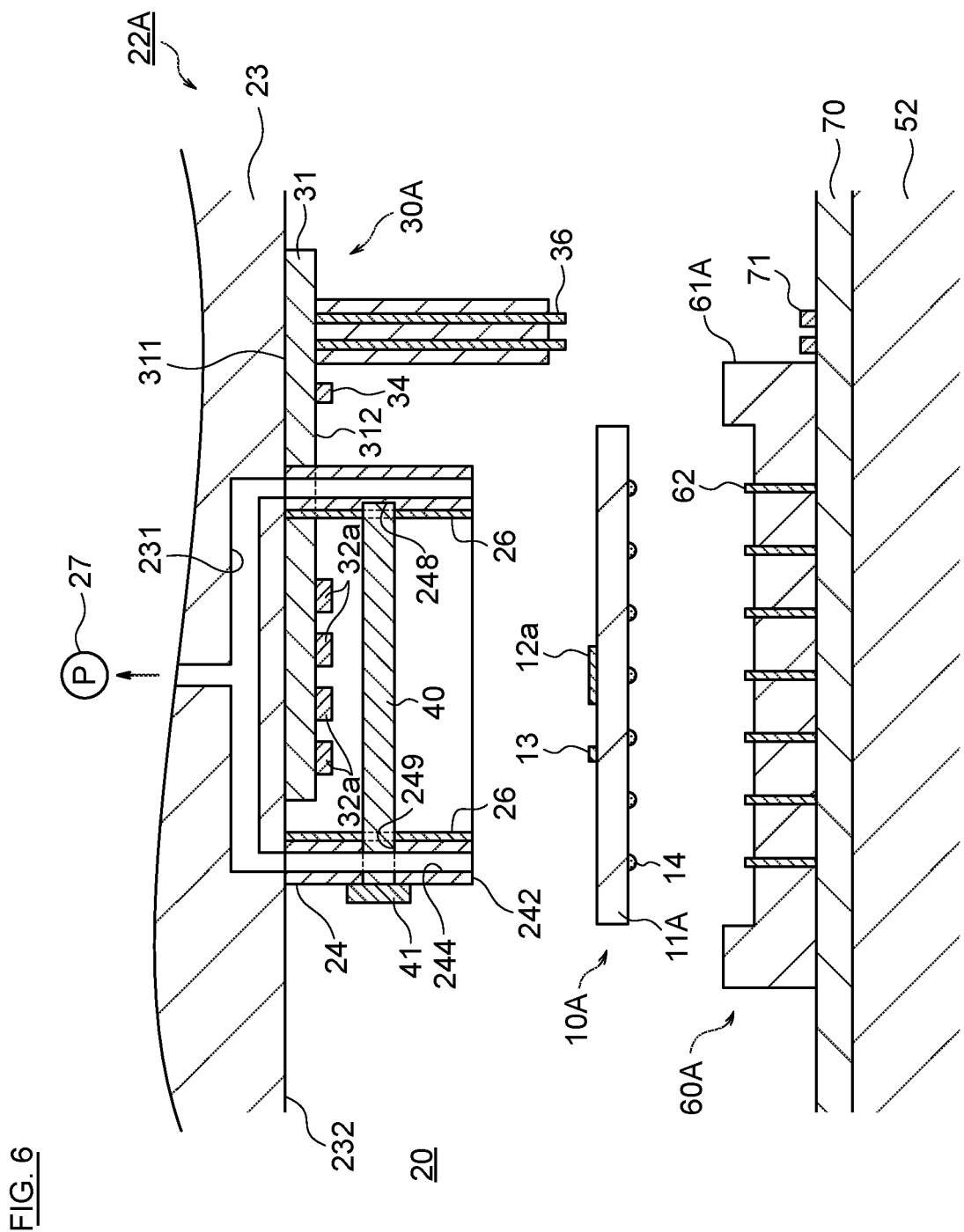
FIG. 6 is an enlarged cross-sectional view showing a second modification of the contact chuck in the first embodiment of the present invention, and is an enlarged cross-sectional view corresponding to FIG. 2.
Figure 7:
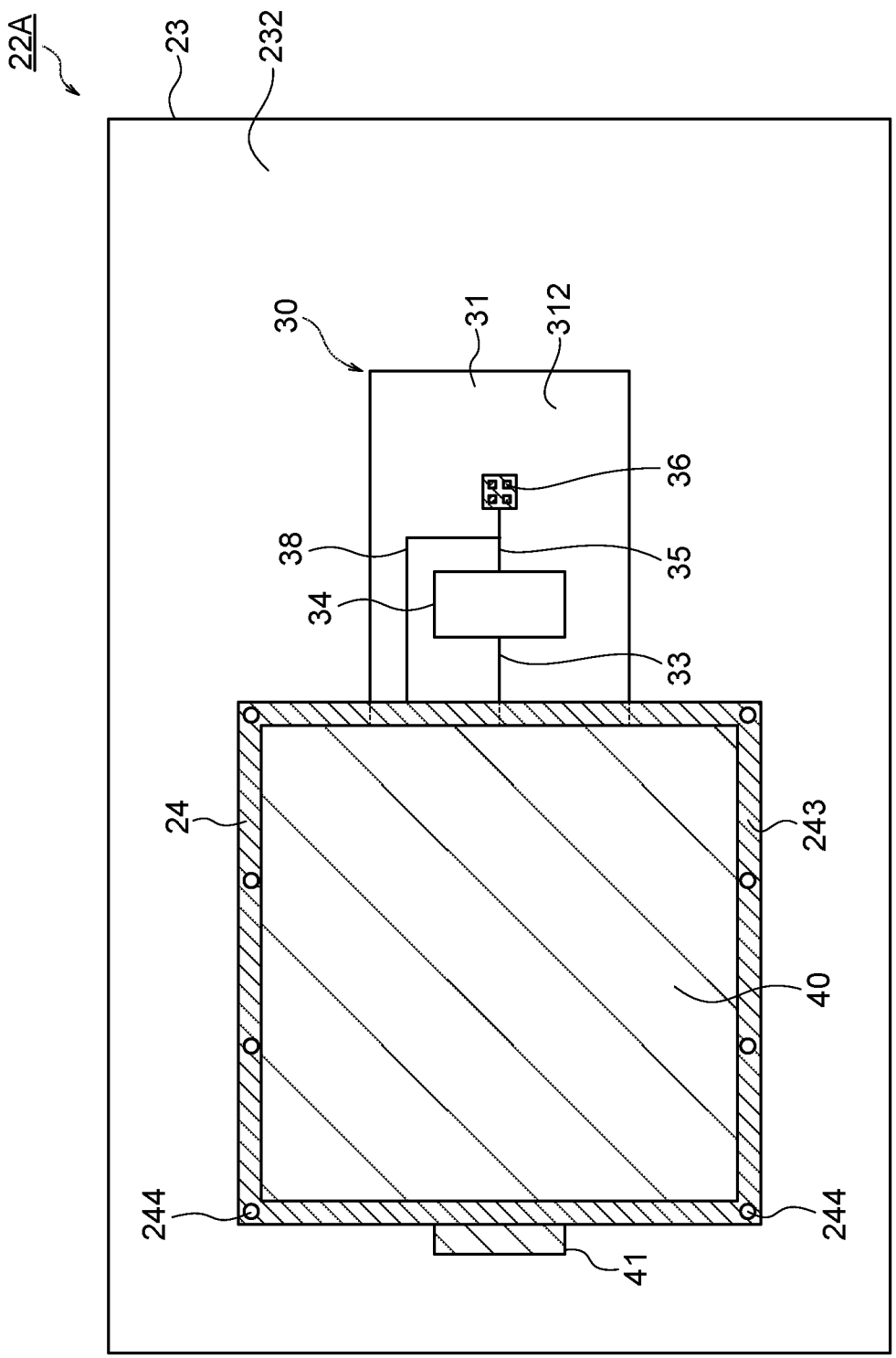
FIG. 7 is a cross-sectional view taken along VII-VII line of FIG. 2.

FIG. 1 is a schematic cross-sectional view showing an overall configuration of an electronic component testing apparatus in the first embodiment, FIG. 2 is an enlarged sectional view showing a part II of FIG. 1, FIG. 2 is an enlarged sectional view showing before pressing the DUT to the socket, FIG. 3 is a cross-sectional view taken along a III-III line of FIG. 2, FIG. 4 is an enlarged sectional view corresponding to the part II of FIG. 1, FIG. 5 is an enlarged sectional view showing a first modification of the contact chuck in the first embodiment, FIG. 6 is an enlarged sectional view showing a second modification of the contact chuck in the first embodiment, FIG. 2 corresponding enlarged sectional view, FIG. 7 is a cross-sectional view taken along VII-VII of FIG. 2.

As shown in FIGS. 1 and 2, the electronic component testing apparatus 1A in this embodiment is an apparatus for performing OTA tests of a DUT 10A having a device antenna 12*a*. This testing apparatus 1 tests the radio wave radiation and reception characteristics of the DUT 10A. For the test of radiation characteristics, a test antenna 30A (to be described later) receives radio waves (so-called millimeter waves) with a frequency of 24.250 to 52.600 GHz, which are radiated from the DUT 10A, in the near-field. For the test of reception characteristics, the DUT 10A receives the millimeter waves, which are radiated from the test antenna 30A, in the near-field.

As shown in FIG. 2, the DUT 10A to be tested is a so-called AiP (Antenna in Package) device. The DUT 10A includes a device antenna 12a formed on the substrate 11A, a semiconductor chip 13 mounted on the upper surface of the substrate 11A, and input-output terminals 14 formed on the lower surface of the substrate 11A. The semiconductor chip 13 is a device for controlling the transmission and reception of the device antenna 12a. Specific examples of device antennas 12a may include patch antennas, dipole antennas, and Yagi antennas. The semiconductor chip 13 may be mounted on the lower surface of the substrate 11A although not shown.

The DUT 10A in the present embodiment corresponds to an example of the "DUT," and the device antenna 12a in the present embodiment corresponds to an example of the "first antenna," in this disclosure.

As shown in FIG. 1, the electronic component testing apparatus 1A according to the present embodiment includes a handler 2 for moving the DUT 10A and a tester 5 for performing the DUT 10A test. The handler 2 presses the DUT 10A against the socket 60A mounted on the test head 52 provided in the tester 5, and electrically connects the DUT 10A to the tester 5. The tester 5 performs the following test on the DUT 10A. First, the tester 5 tests the radio waves radiation characteristics of the DUT 10A. The tester 5 sends a test signal to the DUT 10A through the socket 60A, radiating radio waves from the device antenna 12a of the DUT 10A, receiving the radio waves at test antenna 30A (to be described later) provided on the contact chuck 22A (to be described later). Next, the tester 5 tests the radio wave reception characteristics of the DUT 10A by radiating radio waves from the test antennas 30A and receiving the radio waves at the DUT 10A.

The electronic component testing apparatus 1A in the present embodiment corresponds to an example of the "electronic component testing apparatus," the handler 2 in the present embodiment corresponds to an example of the "electronic component handling apparatus," the tester 5 in the present embodiment corresponds to an example of the "tester," and the socket 60A in the present embodiment corresponds to an example of the "socket," in this disclosure.

The handler 2, as shown in FIG. 1, includes a thermostatic chamber 20 and a contact arm 21. The contact arm 21 in the present embodiment corresponds to an example of the "moving device" in this disclosure.

The handler 2 has a laterally projecting portion, and the thermostatic chamber 20 is accommodated in the projecting portion, and a test head 52 is disposed in a space below the projecting portion. That is, the thermostatic chamber 20 is disposed above the test head 52. The socket 60A is disposed in the thermostatic chamber 20 through an opening formed in the bottom of the thermostatic chamber 20. The thermostatic chamber 20 applies high or low temperature to the DUT 10A disposed in the socket 60A. The temperature of the thermostatic chamber 20 may be adjustable in the range of −55° C. to +155° C. although not limited.

The contact arm 21 is a device for moving the DUT 10A, supported by rails (not shown) provided in the handler 2. The contact arm 21 includes an actuator for horizontal movement (not shown) and can move back and forth and left and right according to the rail. Further, the contact arm 21 includes an actuator for vertical movement (not shown) and can move in the vertical direction. The contact arm 21 includes a contact chuck 22A attached to the distal end of the contact arm 21 and can move while holding the DUT 10A. The contact chuck 22A in the present embodiment corresponds to an example of the "holding portion" in this disclosure.

As shown in FIG. 2, the contact chuck 22A includes a chuck body 23, a pusher 24 in contact with the DUT 10A, a test antenna 30A, and an attenuation member 40. The pusher 24 in the present embodiment corresponds to an example of the "tubular portion," the test antenna 30A in the present embodiment corresponds to an example of the "second antenna," and the attenuation member 40 in the present embodiment corresponds to an example of the "attenuation member," in this disclosure.

The chuck body 23 includes a suction pipe 231 which is connected to the vacuum pump 27. The suction pipe 231 is formed inside the chuck body 23 and is open at the lower surface 232 of the chuck body 23.

As shown in FIGS. 2 and 3, the pusher 24 is made of, for example, a conductive material such as a metal material. The pusher 24 has a rectangular tubular shape and is detachably mounted to the chuck body 23. The pusher 24 is replaced in accordance with the replacement of the type of the DUT 10A. The upper end 241 of the pusher 24 is attached to the lower surface 232 of the chuck body 23 and the lower end 242 of the pusher 24 contacts the substrate 11A of the DUT 10A. The pusher 24 has an opening 243 in the lower end 242, the opening 243 is sized to be able to surround the device antenna 12a of the DUT 10A. The opening 243 allows the pusher 24 to surround the device antenna 12a of the DUT 10A. The opening 243 in the present embodiment corresponds to an example of the "opening" in this disclosure.

Further, the pusher 24 has a plurality of suction pipes 244. The suction pipes 244 are formed inside the wall surface of the pusher 24, communicating with the suction pipe 231 of the chuck body 23 and opening at the lower end 242 of the pusher 24. In the present embodiment, when the lower end 242 of the pusher 24 comes into contact with the substrate 11A of the DUT 10A, the air is sucked from the suction pipe 244 by the vacuum pump 27. This allows to suck and held the DUT 10A.

The pusher 24, as shown in FIG. 4, presses the DUT 10A against the socket 60A by descending with the movement of the contact arm 21 downward. This electrically connects the DUT 10A to the tester 5 via the socket 60A during testing of the device antenna 12a of the DUT 10A.

In the present embodiment, the suction pipe 244 is provided inside the wall surface of the pusher 24 and the DUT 10A is sucked and held by suction from the suction pipe 244, however, the method of holding the DUT 10A by the contact chuck 22A is not limited to this. For example, as shown in FIG. 5, the contact chuck 22A may hold the DUT 10A by depressurizing the sealed space 245 partitioned by the chuck body 23, the pusher 24, and the DUT 10A via the suction pipe 231 of the chuck body 23.

In the contact chuck 22A shown in FIG. 5, the pusher 24 does not have a suction pipe, the suction pipe 231 of the chuck body 23 is open directly to the inside of the pusher 24.

Contacting of the pusher 24 with the DUT 10A determines an enclosed space 245, in the interior of the pusher 24, defined by the chuck body 23, the pusher 24, and the DUT 10A. The sealed space 245 is divided into an upper space 246 and the lower space 247 by the attenuation member 40 (described later). The upper space 246 is located above the attenuation member 40, communicating with the suction pipe 231 of the chuck body 23. The lower space 247 is located below the attenuation member 40, communicating with the upper space 246 through a through hole 42 penetrating the attenuation member 40.

Sucking the air of the upper space 246 by the vacuum pump 27 depressurizes both the upper space 246 and the lower part space 247. This allows the pusher 24 to adsorb and hold the DUT 10A.

The attenuation member 40 may be formed of a porous material to communicate the upper space 246 and the lower space 247. That is, the upper space 246 and the lower space 247 may communicate with each other by the plurality of pores of the porous material communicating from the upper surface to the lower surface of the attenuation member.

As shown in FIG. 6, in the present embodiment, the pusher 24 may have a sheet-like radio wave absorber 26 arranged along the inner wall of the pusher 24. The radio wave absorber 26 has a rectangular tubular shape along the shape of the pusher 24 and is allowed to surround the device antenna 12a of the DUT 10A. The radio wave absorber 26 on the inner wall of the pusher 24 reduces the reflection of radio waves inside the pusher 24 during the OTA test. This allows to perform the OTA test in the near-field with higher accuracy. As a material constituting the radio wave absorber 26, the same material as that of the material constituting the attenuation member 40 described later can be used.

As shown in FIGS. 2 and 3, the contact chuck 22A includes a test antenna 30A on the lower surface 232 of the chuck body 23. A portion of this test antenna 30A is disposed within the opening 243 of the pusher 24, while the remaining portion of the pusher 24 is disposed outside of the pusher 24. The test antenna 30A can receive radio waves transmitted from the device antenna 12a of the DUT 10A and can transmit radio waves to the device antenna 12a.

The test antenna 30A includes a substrate 31, a plurality of radiating elements 32a, a first wiring pattern 33, a detector 34, a second wiring pattern 35, pogo pins 36, and a third wiring pattern 38.

The substrate 31 in the present embodiment corresponds to an example of the "substrate," the radiating element 32a in the present embodiment corresponds to an example of the "radiating element," the detector 34 in the present embodiment corresponds to an example of the "detector," the first wiring pattern 33 in the present embodiment corresponds to an example of the "wiring pattern," and the pogo pin 36 in the present embodiment corresponds to an example of the "first connector," in this disclosure.

The substrate 31 has a flat plate shape, the upper surface 311 of the substrate 31 is fixed to the lower surface 232 of the chuck body 23. A part of the substrate 31 is disposed within the opening 243 of the pusher 24 and the other parts of the substrate 31 is disposed outside the opening 243.

As shown in FIG. 3, the plurality of (16 in this embodiment) radiating elements 32a are rectangular metal foils and are arranged in a matrix (4 rows×4 columns in this embodiment) on the lower surface 312 of the substrate 31. The substrate 311 has a ground layer provided on the entire surface of the upper surface 311 although not particularly illustrated. That is, the test antenna 30A has a patch array antenna (microstrip antenna) including the radiating elements 32a. The radiating elements 32a, the first wiring pattern 33, the second wiring pattern 35, and the third wiring pattern 38 are formed by patterning the metal layer on the lower surface 312 of the substrate 31.

The radiating elements 32a, in this embodiment, are provided inside the pusher 24. That is, the radiating elements 32a are surrounded by the pusher 24. As shown in FIGS. 2 and 4, the radiating elements 32a are disposed inside the opening 243 of the pusher 24 to face the device antenna 12a of the DUT 10A when the pusher 24 is in contact with the DUT 10A. The distance between the radiating elements 32a and the device antenna 12a is adjusted so that the radio wave radiated from the device antenna 12a can reach the radiating elements 32a in the near-field.

The pusher 24 provided to surround the radiating elements 32a of the test antenna 30A and the device antenna 12a of the DUT 10A enables the testing apparatus 1 to test the radiating elements 32a and the device antenna 12a while shielding the noise from the outside. This further improves the accuracy of the test. Using the pusher 24, which is a replacement part as a shield, eliminates a drastic design change of the contact chuck 22 and reduces an increase in cost.

In the present embodiment, a plurality of radiating elements 32a are provided on the substrate 31, but the number of radiating elements 32a may be one. Although the plurality of radiating elements 32a are arranged in a matrix of 4 rows×4 columns, the number of rows and the number of columns are not limited to this. For example, the radiating elements 32a may be arranged in 8 rows×8 columns. The plurality of radiating elements 32a may be arranged in a row, not in a matrix. In the present embodiment, a patch antenna is exemplified as the radiating elements 32a, but a horn antenna, a Yagi antenna, and a dipole antenna may be used as the radiating elements 32a.

As shown in FIG. 3, the radiating elements 32a are connected to a first wiring pattern 33. The first wiring pattern 33 is a microstrip line. The first wiring pattern 33 feeds the radiating elements 32a and transmits an electrical signal from the radiating elements 32a to the detector 34.

The first wiring pattern 33 is branched on one end. Each of the branched ends of the first wiring pattern 33 is connected to the corresponding one of the radiating elements 32a. The other end of the first wiring pattern 33 is connected to the detector 34. This causes the RF signal sent from the radiating elements 32a to merge in the other side of the first wiring pattern 33 and send the RF signal to the detector 34.

As shown in FIGS. 2 and 3, the detector 34 and the pogo pins 36 are provided on the outside of the pusher 24. The detector 34 and pogo pins 36 are provided at a position exposed from the attenuation member 40 at the lower surface 312 of the substrate 31 of the test antenna 30A. That is, the detector 34 and the pogo pins 36, in a plan view, are provided at a position that does not overlap with the attenuation member 40.

The detector 34 includes a detection circuit including a diode. The detector 34 is electrically connected to the radiating elements 32a via the first wiring pattern 33 and is electrically connected to the pogo pins 36 via the second wiring pattern 35. The detector 34 converts a high-frequency signal (RF signal) to a DC signal using the detection circuit.

Such detector 34 allows to convert the RF signal from the radiating elements 32a to a DC signal and use a cheaper connector or cable, not a connector or cable for millimeter wave band. Additionally, such detector 34 eliminates to install a hardware for measuring millimeter wave bands in tester 5 and allows to measure the voltage value using a cheaper direct voltage meter. This reduces an increase in cost.

The pogo pins 36 are electrically connected to the detector 34 via the second wiring pattern 35. As shown in FIG. 4, the pogo pins 36 can be brought into contact with the pads 71 provided on the load board (performance board) 70 with pressing the DUT 10A against the socket 60A by the contact arm 21. The test antenna 30A, which is electrically connected to the tester 5 via the pogo pins 36 and the pads 71 while the DUT 10A is pressed against the socket 60A by the pusher, can transmit signals to the tester 5 and receive signals from the tester 5.

That is, the RF signal transmitted from the radiating elements 32a of the test antenna 30A is converted into a DC signal by the detector 34, then the DC signal is transmitted to the tester 5 via the pogo pins 36. On the other hand, the DC signal from the tester 5 is converted into an RF signal by the detector 34, then the radiating elements 32a that receives the RF signal radiates radio waves.

As described above, in this embodiment, the test antenna 30A and the tester 5 can directly transmit and receive signals via the pogo pins 36 provided on the contact chuck 22A. This shortens the transmission distance between the test antenna 30 and the tester 5 and allows to reduce the transmission loss, thus, further improves the accuracy of the test of the device antenna 12a of the DUT 10A.

The pads connected to the pogo pins 36 may be provided in the socket 60A. Alternatively, pogo pins may be provided on the load board 70 and pads capable of contacting the pogo pins may be provided to the test antenna 30A. In this case, contacting of the pogo pins and the pads in accordance with pressing the DUT10A to the socket 60A by the contact arm 21 causes the test antenna 30A and the tester 5 to be electrically connected to each other.

The detector 34 of the test antenna 30A may be omitted. In this case, the RF signal is sent from the test antenna 30A to the tester 5 without converting the DC signal. Thus, a coaxial connector or a waveguide for millimeter wave band may be the pogo pins 36 described above to electrically connect the test antenna 30A without the detector 34 to the load board 70.

When using a coaxial connector in place of pogo pins, for example, the upper coaxial connector is connected to the radiating elements 32a and the ground layer via the first wiring pattern 33. Connecting the lower coaxial connector provided on the load board 70 in accordance with pressing the DUT 10A to the socket 60A by the contact arm 21 connects the test antenna 30 to the tester 5.

On the other hand, when using a waveguide instead of pogo pins, for example, the upper waveguide is connected to the upper coaxial connector described above via a coaxial waveguide conversion adapter. Connecting the upper waveguide to the lower waveguide provided on the load board 70 in accordance with pressing the DUT 10A to the socket 60A by the contact arm 21 connects the test antenna 30 to the tester 5.

The third wiring pattern 38 is connected to the first wiring pattern 33 at one end and to the second wiring pattern 35 at the other end. The tester 5 transmits the RF signal to the radiating elements 32a via the pogo pins 36, a second wiring pattern 35, a third wiring pattern 38, and the first wiring pattern 33. The radiating elements 32a which have received the RF signal from the tester 5 radiate radio waves to the device antenna 12a.

As shown in FIGS. 2 and 7, the attenuation member 40 is a plate-shaped member made of a material capable of attenuating radio waves (particularly millimeter waves). The material constituting the attenuation member 40 is a material capable of attenuating radio waves, for example, the same material as the material constituting the radio wave absorber used for the inner wall of the anechoic chamber. Specifically, a ferrite and a resin material can be exemplified although not limited. The amount of the attenuation of the radio waves by the attenuation member 40 may be adjusted by adjusting thickness of the attenuation member 40. Alternatively, the amount of the attenuation of the radio waves by the attenuation member 40 may be adjusted by changing the content of the wave absorber or the dielectric constant of the radio wave absorber.

The attenuation member 40 is disposed inside the opening 243 of the pusher 24 to face the radiating element 32a. In the present embodiment, the attenuation member 40, in a plan view (when viewed along the vertical direction), closes the opening 243 of the pusher 24 and covers the entire surface of the radiating elements 32a. Further, the attenuation member 40, in a state where the pusher 24 holds the DUT 10A, is disposed to face the device antenna 12a of the DUT 10A and to be interposed between the radiating elements 32a and the device antenna 12a.

As shown in FIG. 2, the attenuation member 40, for example, is fitted into the groove 248 formed on the inner surface of the three sides of the pusher 24 and connected to the fixing member 41 via an opening 249 formed in the remaining one inner surface. Then, fixing the fixing member 41 by screwing to the outer surface of the pusher 24 causes the attenuation member 40 to be fixed to the pusher 24. The attenuation member may be fixed to the pusher 24 by an adhesive.

Thus, the attenuation member 40 interposed between the radiating elements 32a and the device antenna 12a while maintaining the distance on the radio communication between the antennas 30A and 12a, relatively shortens the actual distance between the antennas 30A and 12a. This allows to reduce the size of the contact chuck 22A.

Further, the attenuation member 40 interposed between the radiating elements 32a and the device antenna 12a, while maintaining the actual distance between the antennas 30A and 12A, increases the distance on the radio communication between the antennas 30A and 12a. This allows to reduce the interference of the test antenna 30A and the device antenna 12a and deteriorating the accuracy of the test.

As shown in FIG. 1, the tester 5 includes the main frame 51, the test head 52, the socket 60A, and the load board 70. The main frame 51 is connected to the test head 52 via a cable 511. The main frame 51 sends test signals to the DUT 10A via the test head 52 to test the DUT 10A, and evaluates the DUT 10A according to the test result.

The test head 52 is connected to the main frame 51 via cables 511 and sends test signals to the DUT 10A during the DUT 10A testing. The test head 52 houses pin electronics cards electrically connected to the load board 70 and the socket 60A although not shown.

The load board 70 is electrically connected to the test head 52, and a socket 60A is mounted on the load board 70. When pressing the DUT 10A against the socket 60A by the pusher 24, the DUT 10A is electrically connected to the testing head 52 via the socket 60A and the load board 70.

As shown in FIG. 2, the socket 60A is mounted on the load board 70 and includes a socket body 61A and contactors 62. The contactors 62 are held in the socket body 61A and are arranged to correspond to the input and output terminals 14 of the DUT 10A. As the contactors 62, the pogo pins or anisotropic conductive rubber sheet can be used. As shown in FIG. 4, contacting of the input and output terminals 14 of the DUT 10A with the contactors 62 by the contact arm 21 electrically connects the DUT 10A to the socket 60A. Through the socket 60A and the load board 70, the test signals are sent from the main frame 51 to the DUT 10A.

Hereinafter, the OTA test of the DUT 10A by the electronic component testing apparatus 1A in the present embodiment will be described with reference to FIGS. 2 to 4.

First, the thermostatic chamber 20 starts to adjust the temperature to a predetermined temperature.

Then, the contact arm 21 of the handler 2 moves to just above the DUT 10A and descends toward the DUT 10A, the lower end 242 of the pusher 24 contacts the DUT 10A to surround the device antenna 12a.

Next, the contact chuck 22A sucks and holds the DUT 10A by sucking air from the suction pipe 231 of the chuck body 23. As shown in FIG. 2, the contact chuck 22A holding the DUT 10A moves to directly above the socket 60A by the contact arm 21.

Then, as shown in FIG. 4, the contact chuck 22A descends by the contact arm 21 and press the DUT 10A held by the contact chuck 22A against the socket 60A, connecting the input and output terminals 14 of the DUT 10A to the contactors 62 of the socket 60A. With the DUT 10A being pressed against the socket 60A, the radiating elements 32a of the test antenna 30A is opposed to the device antenna 12a. Thus, the device antenna 12a, the attenuation member 40, and a plurality of radiating elements 32a are arranged on the same straight line along the vertical direction. At this time, with the radiating elements 32a of the test antenna 30A is located in the near-field of the device antenna 12a of the DUT 10A, the device antenna 12a is located in the near-field of the radiating elements 32a.

Then, with the DUT 10A being pressed against the socket 60A, the following the DUT 10A test for determining the characteristics of the radio wave radiation and reception is performed.

Specifically, first, the test signals outputted from the main frame 51 are transmitted to the DUT 10A via the contactors 62 of the socket 60A. Then, the DUT 10A receiving the test signal radiates radio waves upward from the device antenna 12a. This radio wave is attenuated by the attenuation member 40 and then received by the radiating elements 32a of the test antenna 30A. The radio wave, as shown in FIG. 3, is converted into an RF signal, sent to the detector 34 via the first wiring pattern 33, and converted into a DC signal. The DC signal, as shown in FIG. 4, is sent to the pogo pins 36 via a second wiring pattern 35 and then sent to the load board 70 via pads 71 which are electrically connected to the pogo pins 36. The DC signal is sent from the load board 70 via the test head 52 to the main frame 51, the radio wave radiation characteristics of the DUT 10A is evaluated based on the DC signal.

Then, while keeping the DUT 10A pressed against the socket 60A, the test signal (RF signal) outputted from the main frame 51 is sent to the radiating elements 32a via the test head 52, the load board 70, the pogo pin 36, the third wiring pattern 38, and the first wiring pattern 33. The radiating elements 32a which have received the test signal radiate a radio wave downward. This radio wave is attenuated by the attenuation member 40 and then received by the device antenna 12a of the DUT 10A. The radio wave received by the device antenna 12a is converted into an electric signal and then sent to the main frame 51 via the contactors 62 of the socket 60A, the load board 70, and the test head 52, the radio wave reception characteristics of the DUT 10A is evaluated based on the signal.

After the evaluation of the DUT 10A, the contact arm 21 moves upwards and the DUT 10A is moved away from the socket 60A. Thus, the DUT 10A test is completed.

As described above, in the present embodiment, the test antenna 30A of the contact chuck 22A enables the OTA test, in the near-field, of the DUT 10A having the device antenna 12a.

Further, the test antenna 30A being provided on the lower surface 232 of the chuck body 23 of the contact chuck 22A prevents the contact chuck 22A from being affected by the radio waves radiated from the device antenna 12a. This allows to accurately perform the OTA test in the near-field.

Further, in the present embodiment, using the handler 2 including the contact arm 21 having the test antenna 30A allows to automatically perform the test in the near-field. This improves the efficiency of the OTA test.

Further, in the present embodiment, the attenuation member 40 interposed between the radiating elements 32a and the device antenna 12a, while maintaining the distance on the radio communication between the antennas 30A and 12a, relatively shortens the actual distance between the antennas 30A and 12a. This allows to reduce the size of the contact chuck 22A.

Figure 8:
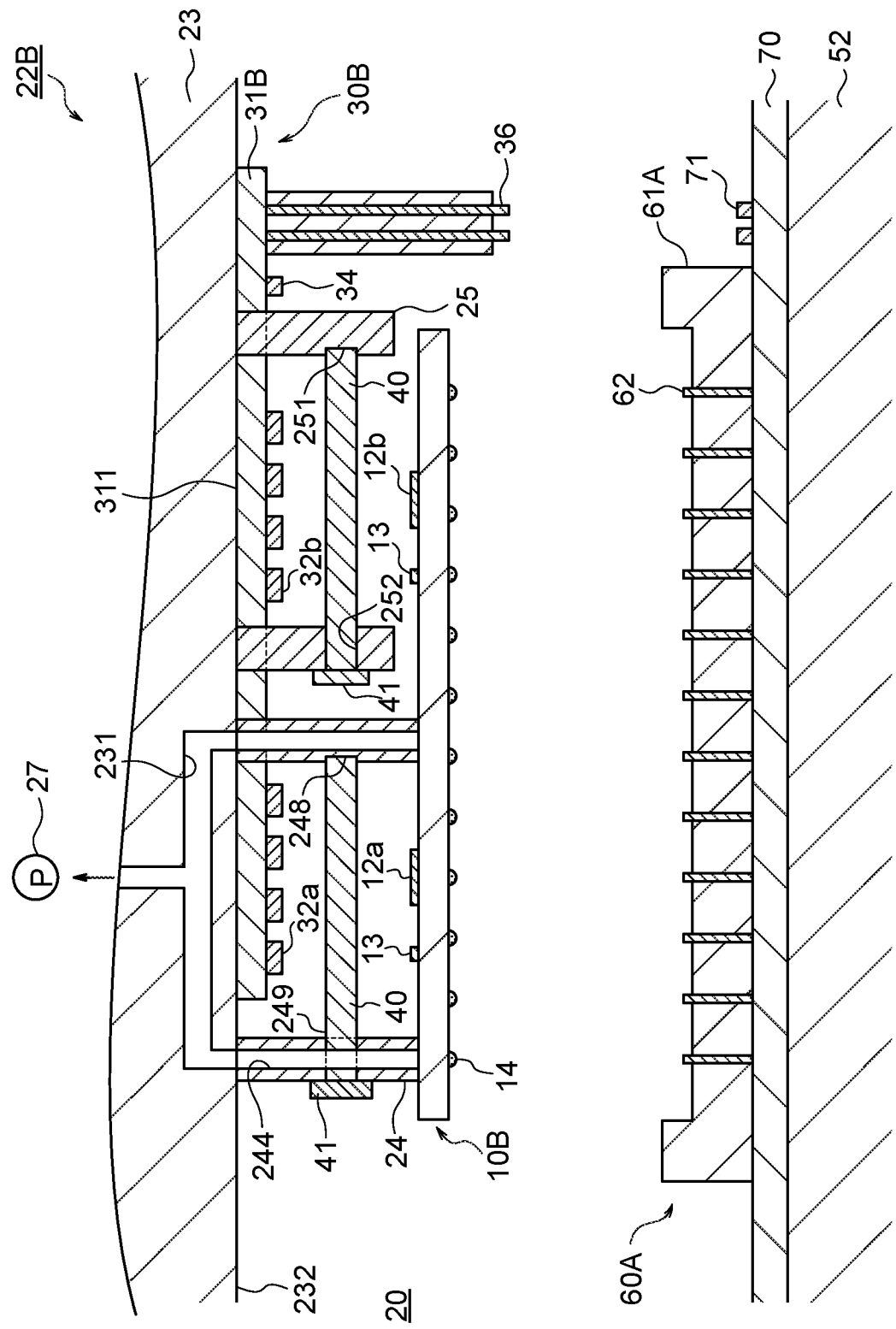
FIG. 8 is an enlarged sectional view showing a third modification of the contact chuck in the first embodiment of the present invention, and is an enlarged sectional view corresponding to FIG. 2.

FIG. 8 is an enlarged sectional view showing a third modification of the contact chuck in the first embodiment and is an enlarged sectional view corresponding to FIG. 2.

As in the modification shown in FIG. 8, the test antenna 30B of the contact chuck 22B may include a plurality of radiating elements 32b located outside the pusher 24 in addition to the plurality of radiating elements 32a located inside the pusher 24. In this modification, the radiating elements 32b are provided on the substrate 31B similarly to the radiating elements 32a and have the same configuration as the radiating elements 32a.

The contact chuck 22B, in addition to the pusher 24 described above, includes a shield 25 that is tubular shape and surrounds the radiating elements 32b. The shield 25 is provided in a region different from the pusher 24 at the lower surface 232 of the chuck body 23 and is detachably attached to the chuck body 23. Further, the shield 25 is not in contact with the DUT 10B. The shield 25, by shielding the noise from the outside of the shield 25, prevents the radio waves, which are radiated from the radiating elements 32b or the device antenna 12b, from being affected by the noise. The material constituting the shield 25 is, for example, a metal material although not limited. The shield 25 may be in contact with the DUT 10B. Further, a radio wave absorber may be provided on the inner wall of the shield 25, similarly to the pusher 24 shown in FIG. 6. The shield 25 in the present embodiment also corresponds to an example of the "tubular portion" in this disclosure.

Inside the shield 25, the attenuation member 40b is provided to face the radiating elements 32b. The attenuation member 40b, similarly to the attenuation member 40 described above, is a plate-shaped member made of a material capable of attenuating radio waves. Further, the attenuation member 40, with the DUT 10B being held by the pusher 24, is disposed to face the device antenna 12b of the DUT 10B and to be interposed between the radiating elements 32b and the device antenna 12b.

The attenuation member 40, for example, is fixed to the inside of the shield 25 similarly to the attenuation member 40 provided inside the pusher 24. That is, the attenuation member 40 is fitted into the groove 251 formed on the inner surface of the three sides of the shield 25 and connected to the fixing member 41 via an opening 252 formed in the remaining one inner surface. Then, fixing the fixing member 41 by screwing to the outer surface of the shield 25 causes the attenuation member 40 to be fixed to the shield 25.

In this modification, in addition to the above-described OTA test in the near-field of the device antenna 12a located inside the pusher 24, the OTA test in the near-field of the device antenna 12b located outside the pusher 24 can also be performed.

In this modification, the radiating elements 32a located inside the pusher 24 may be omitted when the DUT 10B does not include a device antenna 12a at a position surrounded by the pusher 24.

Figure 9:
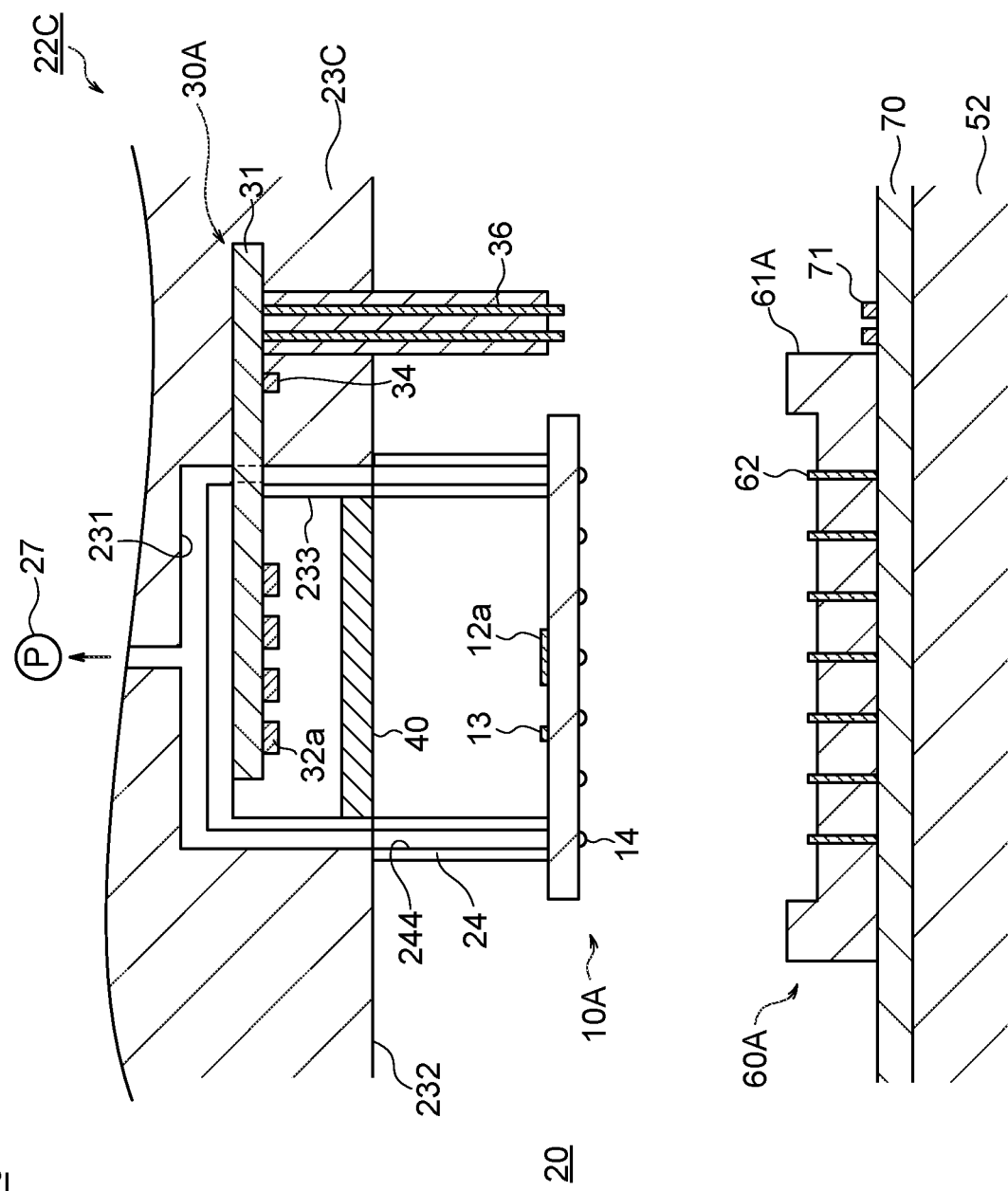
FIG. 9 is an enlarged sectional view showing a fourth modification of the contact chuck in the first embodiment of the present invention, and is an enlarged sectional view corresponding to FIG. 2.

FIG. 9 is an enlarged sectional view showing a fourth modification of the contact chuck in the first embodiment and is an enlarged sectional view corresponding to FIG. 2.

As in the fourth modification shown in FIG. 9, the radiating elements 32a and the attenuation member 40 may be provided inside the concavity (counterbore) 233 provided in the chuck body 23C. The concavity 233 in the present embodiment corresponds to an example of the "concavity" in this disclosure.

In the contact chuck 22C in this modification, a portion of the test antenna 30A is provided inside the concavity 233 of the chuck body 23, the remaining portion of the test antenna 30A is housed inside the chuck body 23C. The radiating elements 32a of the test antenna 30A are provided inside the concavity 233, exposed from the chuck body 23C, and surrounded by the chuck body 23C.

On the other hand, the detector 34 is housed within the chuck body 23C. Further, the root portions of the pogo pins 36 are accommodated within the chuck body 23C, the tip portions of the pogo pins 36 extends to the outside of the chuck body 23C. The tip portions of the pogo pins 36 extend downwardly from the chuck body 23C and are accessible to the corresponding pads 71 of the load board 70, similar to the embodiments described above.

The attenuation member 40 is provided inside the concavity (counterbore) 233 provided in the chuck body 23C, and faces the radiating elements 32a and the device antenna 12a. The attenuation member 40 is interposed between the radiating elements 32a and the device antenna 12a.

Further, in this modification, the pusher 24 is provided to surround the concavity 233, the attenuation member 40 is not attached to the pusher 24.

Figure 10:
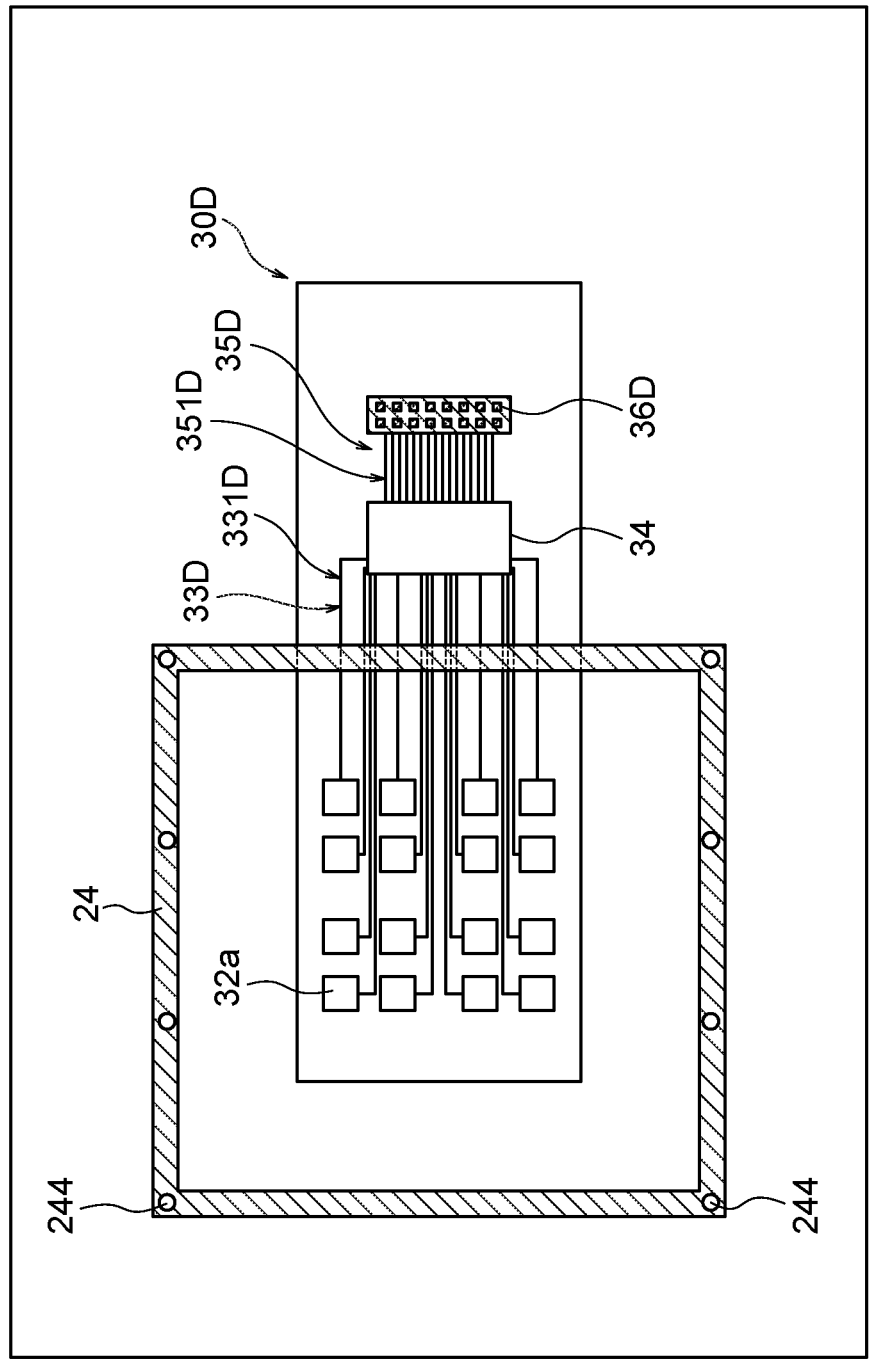
FIG. 10 is a cross-sectional view showing a fifth modification of the contact chuck in the first embodiment of the present invention, and is a cross-sectional view corresponding to FIG. 3.

FIG. 10 is an enlarged sectional view showing a fifth modification of the contact chuck in this embodiment and is an enlarged sectional view corresponding to FIG. 3.

As in this modification, the test antenna 30D may be provided with a plurality of wiring patterns respectively connected to the plurality of radiating elements 32a. As shown in FIG. 10, the test antenna 30D includes a plurality of (16 in this modification) radiating elements 32a, a plurality of (16 in this modification) first wiring patterns 33D, a detector 34, a plurality of (16 in this modification) second wiring patterns 35D, and a plurality of (16 in this modification) pogo pins 36D.

Each of the first wiring pattern 33D is composed of one microstrip line and each of one end of the first wiring pattern 33D is connected to the one radiating element 32a. On the other hand, each of the other end of the first wiring pattern 33D is connected to the detector 34. Each of the first wiring pattern 33D is independent and not electrically connected to the other first wiring pattern 33D. The RF signal sent from the radiating elements 32a, respectively, is sent to the detector 34 via the first wiring pattern 33D.

The detector 34 converts a plurality of (16 in this modification) RF signals to the DC signals. The RF signal does not merge with other RF signals and the DC signal also does not merge with other DC signals, in this detector 34.

Each second wiring pattern 35D is composed of one microstrip line and each of one end of the second wiring pattern 35D is connected to the detector 34. On the other hand, each of the other end of the second wiring pattern 35D is connected to one end of the pogo pins 36D. Each of the second wiring pattern 35D is independent and not electrically connected to the other second wiring pattern 35D. The second wiring pattern 35D is electrically connected to one of the first wiring pattern 33D via the detector 34. A plurality of (16 in this modification) DC signals output from the detector 34, respectively, are sent to the pogo pins 36D via the second wiring pattern 35D.

One of the pogo pins 36D delivers one DC signal delivered from the second wiring pattern 35D to the test head 52 via pads 71 of the load board 70 (see FIG. 2) described above.

As described above, in this modification, in the first wiring pattern 33D, the detector 34, the second wiring pattern 35D, and the pogo pins 36D, each of the signal sent from the radiating elements 32a does not merge and is sent to the test head 52 (see FIG. 1) independently of each other. This allows to measure the intensity of the detected radio waves for each radiating element 32a and, in the OTA test of this modification, to evaluate the directivity based on the distribution.

In this modification, for convenience, it is not shown the third wiring pattern 38 described above.

Further, in the present modification, the number of the pogo pins 36D is not limited to the same number as the second wiring pattern 35D. For example, the test antenna 30D may include a single pogo pin 36D and a switch interposed between the pogo pin 36D and the 16 second wiring pattern 35D, and the OTA test may be carried out while switching the second wiring pattern 35D to be connected to the pogo pin 36D. This allows to reduce the number of pogo pins.

The Second Embodiment

Figure 11:
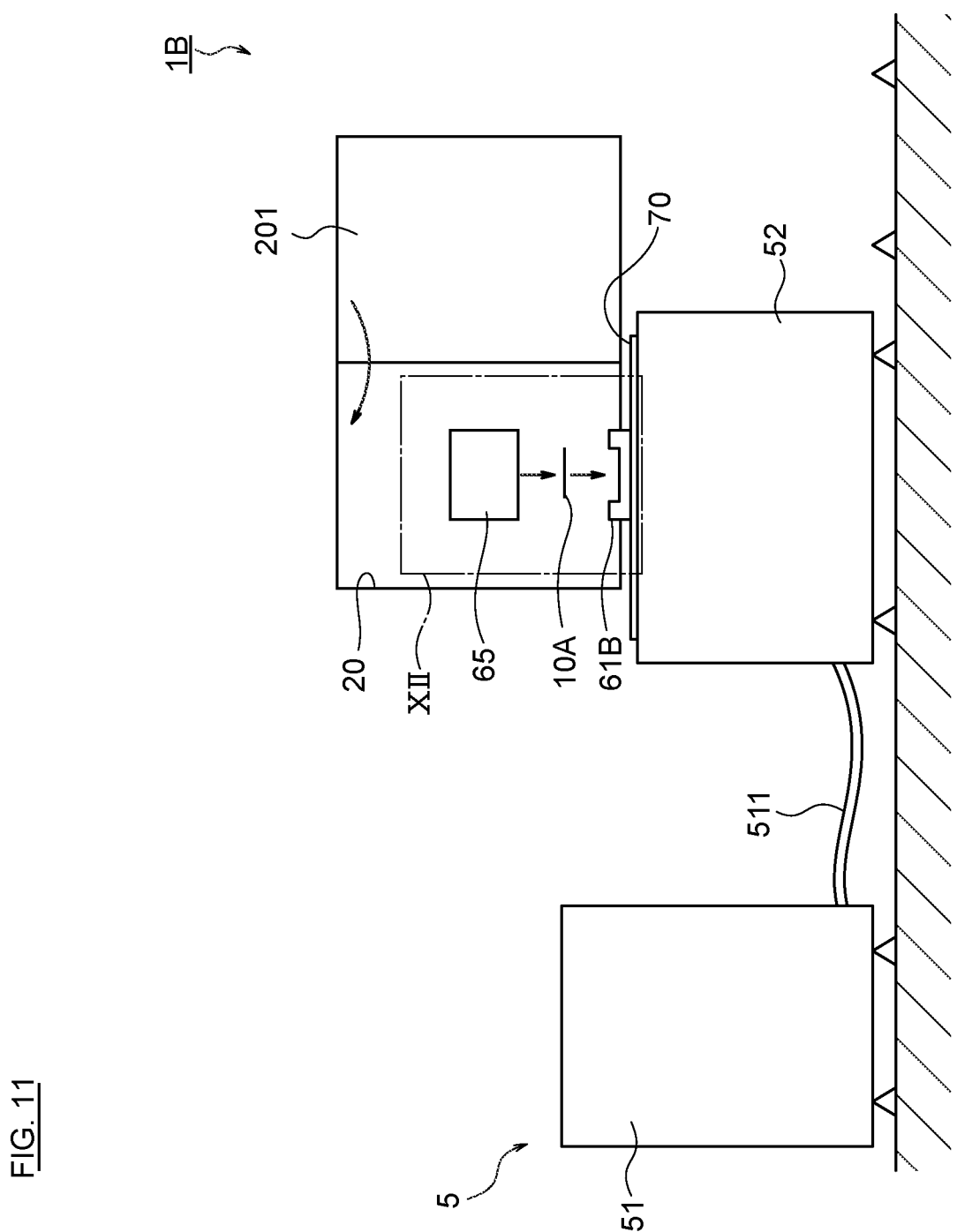
FIG. 11 is a schematic cross-sectional view showing the overall configuration of the electronic component testing apparatus according to the second embodiment of the present invention.
Figure 12:
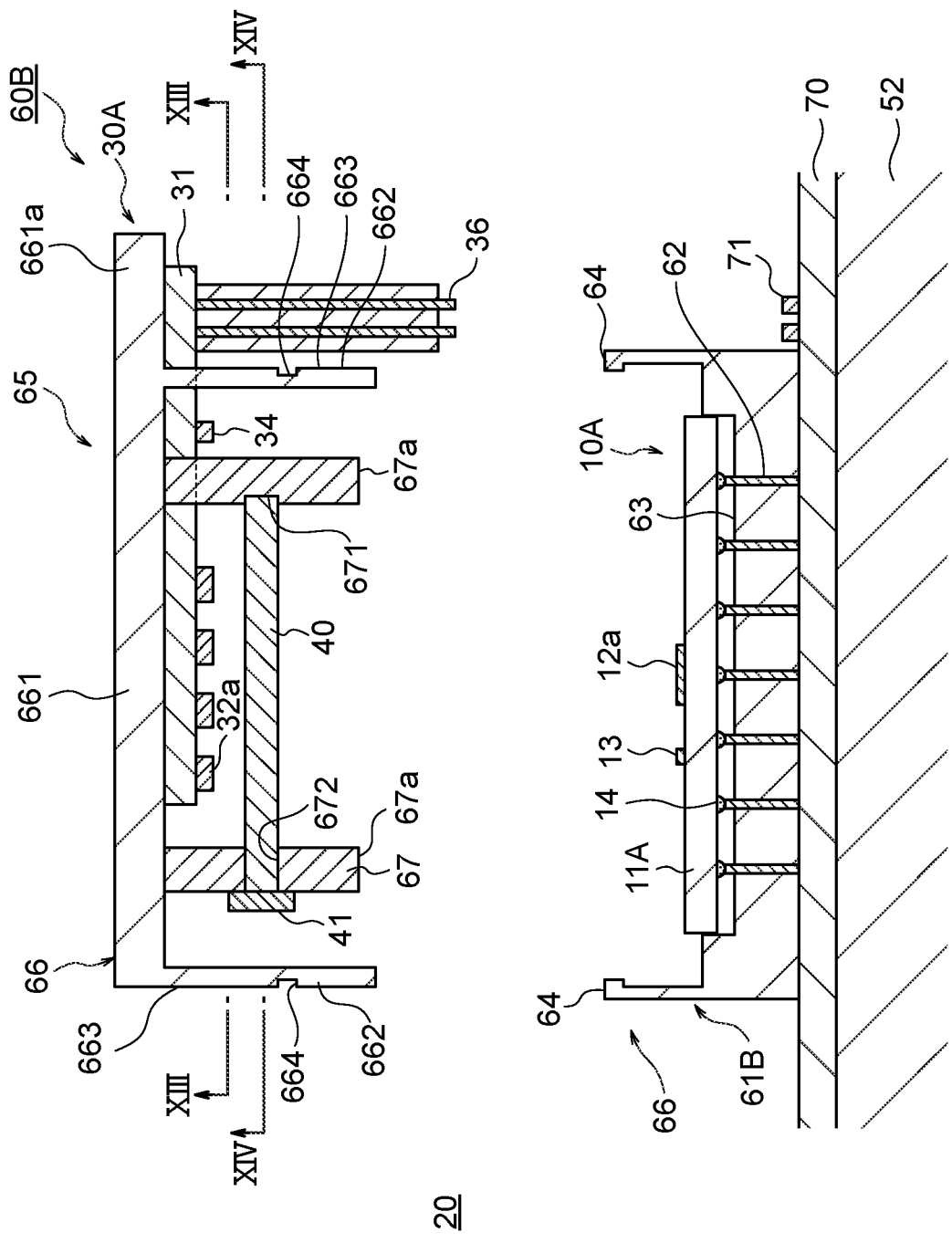
FIG. 12 is an enlarged cross-sectional view corresponding to part XII of FIG. 11, showing before pressing the DUT against the socket.
Figure 13:
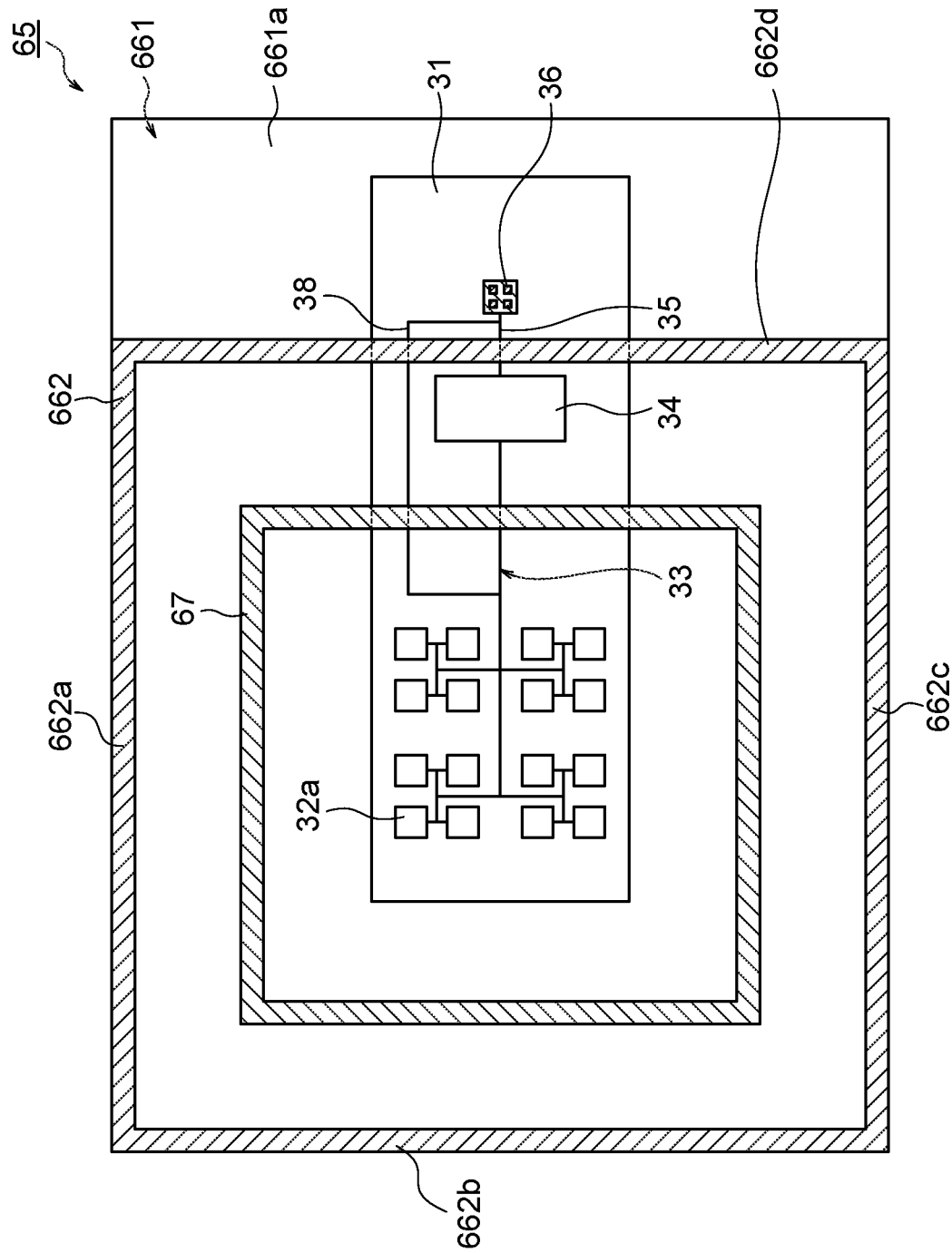
FIG. 13 is a cross-sectional view taken along XIII-XIII line of FIG. 12.
Figure 14:
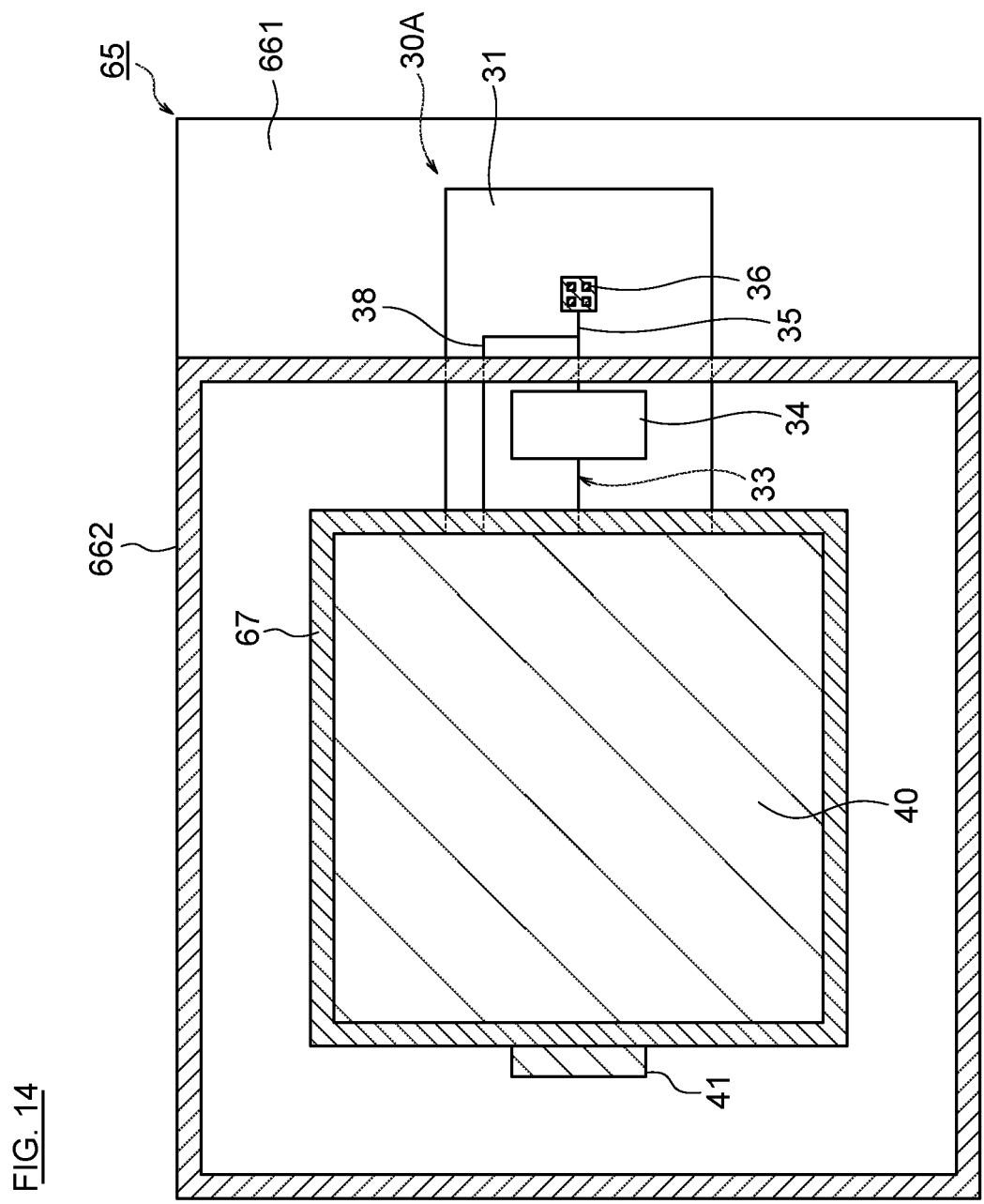
FIG. 14 is a cross-sectional view taken along XIV-XIV of FIG. 12.
Figure 15:
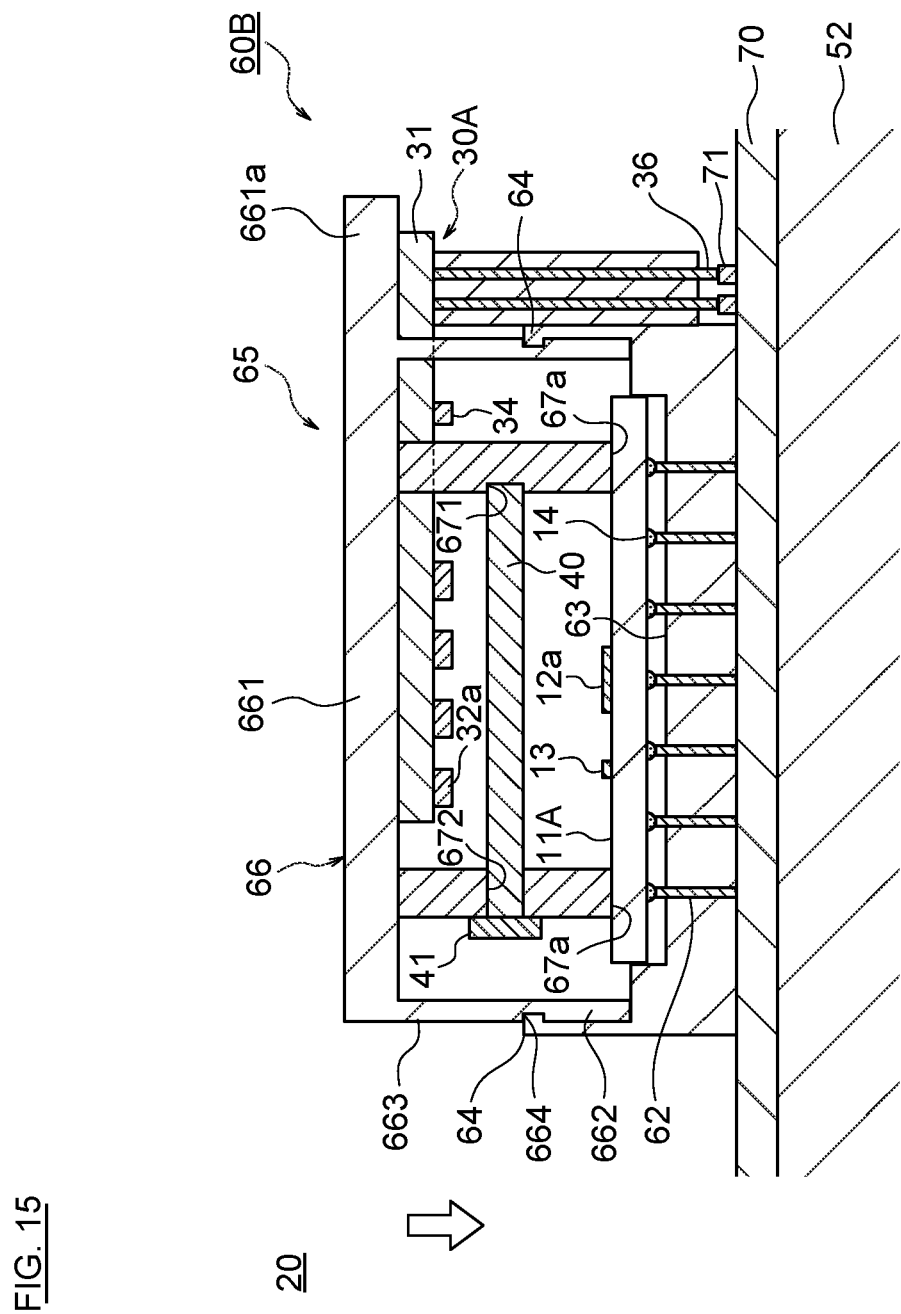
FIG. 15 is an enlarged sectional view corresponding to the XII portion of FIG. 11 and is a diagram showing pressing the DUT against the socket.

FIG. 11 is a schematic cross-sectional view showing the overall configuration of the electronic component testing apparatus in the second embodiment, FIG. 12 is an enlarged sectional view corresponding to the XII portion of FIG. 11, FIG. 13 shows a state prior to pressing the DUT to the socket, a cross-sectional view taken along XIII-XIII line of FIG. 12, FIG. 14 is a sectional view taken along XIV-XIV line of FIG. 12, FIG. 15 is an enlarged sectional view corresponding to the XII portion of FIG. 11 is a diagram showing a state of pressing the DUT to the socket.

The electronic component testing apparatus 1B in the present embodiment is an apparatus for manually setting the DUT 10A in the socket 60B to test a the DUT 10A and is a so-called manual-type testing apparatus. In the present embodiment, the electronic component testing apparatus 1B does not include the handler 2 (the contact arm 21 and the contact chuck 22A) and the configuration of the socket 60B is different from that of the socket 60A of the first embodiment, but the other configurations are the same. Hereinafter, only the difference between the electronic component testing apparatus 1B in the second embodiment and the first embodiment will be described, and the same reference numerals are assigned to the same components as those in the first embodiment, and descriptions thereof will be omitted.

The electronic component testing apparatus 1B in the present embodiment, as shown in FIG. 11, the thermostatic chamber 20 has a door 201. Opening the door 201 allows to manually set the DUT 10A and the socket cover 65 to the socket body 61B inside the thermostatic chamber 20.

The socket 60B, as shown in FIG. 12, includes a socket body 61B having contactors 62 and a socket cover 65 for covering the socket body 61B. The socket body 61B in the present embodiment corresponds to an example of the "socket body," the contactors 62 in the present embodiment corresponds to an example of the "contactor," and the socket cover 65 in the present embodiment corresponds to an example of the "socket cover" in this disclosure.

The socket cover 65 is a member for covering the DUT 10A placed on the socket body 61B, during the test of the DUT 10A, and has a function of pressing the DUT 10A against the socket body 61B.

The socket cover 65 includes a cover body 66, a pusher 67, a test antenna 30A, and an attenuation member 40.

The cover body 66 includes a top plate 661 and a side wall 662. The top plate 661, in plan view, has a rectangular outer shape. The top plate 661 has a flange 661a extending to the outside of the side wall 662.

The side wall 662 is integrally formed with the top plate 661 described above has a square tubular shape extending from the lower surface of the top plate 661. As shown in FIG. 13, the side wall 662 has a first side wall 662a, a second side wall 662b, a third side wall 662c, and a fourth side wall 662d, and the first to third side walls 662a to 662c are provided along the outer peripheral edge of the top plate 661. The fourth side wall 662d is not provided along the outer peripheral edge of the top plate 661 but is provided inside the outer peripheral edge. This determines the flange 661a on the top plate 661.

As shown in FIG. 12, the outer surface 663 of the side wall 662, the concavity 664 is provided. The concavity 664 is formed to engage the latch 64 of the socket body 61B (described later).

The pusher 67 has a rectangular tubular shape and is provided inside the side wall 662. The upper end of the pusher 67 is mounted to contact the lower surface of the cover body 66. The lower end 67a of the pusher 67 contacts the substrate 11A of the DUT 10A. Further, the pusher 67 has an opening at the lower end 67a, which has a size enough to surround the device antenna 12a of the DUT 10A.

The test antenna 30A is provided on the lower surface of the top plate 661 from the inside of the pusher 67 to the flange 661a. The test antenna 30A has basically the same configuration as the test antenna 30A of the first embodiment. The radiating elements 32a of the test antenna 30A are provided inside the pusher 67 similarly to the first embodiment. The detector 34 is provided on the outside of the pusher 67 and inside the side wall 662.

The pogo pins 36 are disposed at a position corresponding to the flange 661a of the top plate 661 and outside the side wall 662. As shown in FIG. 15, in the present embodiment, the pogo pins 36 are disposed outside the side wall 662 which engages the latch 64 of the socket body 61B to be connected to the pads located outside the socket body 61B. The socket body 61B may be provided with pads connected to the pogo pins 36, and in this case, the pogo pins 36 may be disposed inside the side wall 662.

Incidentally, the pogo pins may be provided on the load board 70, the test antenna 30A may include pads contactable to the pogo pins, and the test antenna 30A may be electrically connected to the tester 5 with pressing the DUT 10A against the socket body 61B by the pusher 67 of the socket cover 65.

The test antenna 30A has a detector 34, but is not limited thereto, the detector 34 may be omitted. For the detector 34 being omitted, similarly to the first embodiment, a coaxial connector or a waveguide or for millimeter wave band may be the pogo pins 36 described above to electrically connect the test antenna 30A and the load board 70.

As shown in FIGS. 12 and 14, the attenuation member 40, similarly to the first embodiment, is disposed inside the opening of the pusher 67. The attenuation member 40, as shown in FIG. 15, is disposed to be interposed between the radiating elements 32a and the device antenna 12a when the pusher 67 contacting the DUT 10A.

As shown in FIG. 12, the attenuation member 40, for example, is fitted into the groove 671 formed on the inner surface of the three sides of the pusher 67 and is connected to the fixing member 41 via an opening 672 formed in the remaining one inner surface. Then, fixing the fixing member 41 by screwing to the outer surface of the pusher 67 causes the attenuation member 40 to be fixed to the pusher 67.

As shown in FIG. 12, the socket body 61B, in that it has a latch 64 is different from the socket body 61A in the first embodiment. The latch 64 is attached to the upper portion of the socket body 61B and protrudes upward. The latch 64, as shown in FIG. 15, has a shape that engages with the concavity 664 of the socket cover 65. The latch 64 engaged with the concavity 664 of the socket cover 65 causes the socket cover 65 to be fixed to the socket body 61B and the pusher 67 to press the DUT 10A against the socket body 61B.

Referring to FIGS. 12 and 15, the OTA test of the DUT 10A performed by the electronic component testing apparatus 1B according to the present embodiment will be described below.

First, as shown in FIG. 12, placing the DUT10A on the mounting surface 63 of the socket body 61B, contacting the input and output terminals 14 of the DUT 10A with the contactors 62 of the socket body 61B.

As shown in FIG. 15, the socket cover 65 is lowered toward the DUT 10A from right above the DUT 10A. Then, engaging the latch 64 of the socket body 61B to the concavity 664 of the socket cover 65 fixes the socket cover 65 to the socket body 61B. This causes the lower end 67a of the pusher 67 to contact the DUT 10A to surround the device antenna 12a and the DUT 10A to be pressed against the socket body 61B.

Fixing the socket cover 65 to the socket body 61B arranges the device antenna 12a, the attenuation member 40, and a plurality of radiating elements 32a side by side on the same straight line.

Then, while the DUT 10A is pressed against the socket body 61B, the thermostatic chamber 20 adjusts the temperature in the thermostatic chamber 20 to a predetermined temperature and the radio wave emission characteristics and the radio wave reception characteristics of the DUT 10A are tested.

Specifically, first, the test signals outputted from the main frame 51 are transmitted to the DUT 10A via the contactors 62 of the sockets 60B. Then, DUT 10A receiving the test signal radiates radio waves upward from the device antenna 12a. This radio wave is attenuated by the attenuation member 40 and then received by the radiating elements 32a of the test antenna 30A. The radio wave, as shown in FIG. 13, is converted into an RF signal, sent to the detector 34 via the first wiring pattern 33, and converted into a DC signal. The DC signal is sent to the pogo pins 36 via a second wiring pattern 35 and then sent to the load board 70 via pads 71 which are electrically connected to the pogo pins 36. The DC signal is sent from the load board 70 via the test head 52 to the main frame 51, the radio wave radiation characteristics of the DUT 10A is evaluated based on the DC signal.

Then, while keeping the DUT 10A pressed against the socket 60A, the test signal (RF signal) outputted from the main frame 51 is sent to the radiating elements via the test head 52, the load board 70, pogo pins 36, the second wiring pattern 35, the third wiring pattern 38 and the first wiring pattern 33. The radiating elements 32a which have received the test signal radiate a radio wave downward. This radio wave is attenuated by the attenuation member 40 and then received by the device antenna 12a of the DUT 10A. The radio wave received by the device antenna 12a is converted into an electric signal and then sent to the main frame 51 via the contactors 62 of the socket 60B, the load board 70, and via the test head 52, the radio wave reception characteristics of the DUT 10A is evaluated based on the signal.

After the evaluation of the DUT 10A, the socket cover 65 is removed from the socket body 61B and the DUT 10A is removed from the socket body 61B. This completes the DUT 10A test.

As described above, in the present embodiment, similarly to the first embodiment described above, the test antenna 30A of the socket cover 65 enables the OTA test, in the near-field, of the DUT 10A having the device antenna 12a with high accuracy.

Further, in the present embodiment, attenuating member 40 interposed between the radiating elements 32a and the device antenna 12a, while maintaining the distance on the radio communication between the test antennas 30A and 12a, relatively shortens the actual distance between the test antennas 30A and 12a. This allows to reduce the size of the socket 60B.

The embodiments explained heretofore are described to facilitate understanding of the present invention and are not described to limit the present invention. It is therefore intended that the elements disclosed in the above embodiments include all design changes and equivalents to fall within the technical scope of the present invention.

For example, in the embodiments above, the electronic component testing apparatus tests both the radio wave radiation characteristic and the radio wave reception characteristic of the DUT, but the embodiments are not particularly limited thereto. For example, the electronic component testing apparatus may test only one of the radio wave radiation characteristics or the radio wave reception characteristic of the DUT.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATIONS OF LETTERS OR NUMERALS 1A,1B . . . Electronic component testing apparatus
2 . . . Handler
20 . . . Thermostatic chamber
201 . . . Door
21 . . . Contact arm
22A, 22B, 22C . . . Contact chuck
23, 23C . . . Chuck body
231 . . . Suction pipe
232 . . . Lower surface
233 . . . Concavity
24 . . . Pusher
241 . . . Upper end
242 . . . Lower end
243 . . . Opening
244 . . . Suction pipe
245 . . . Sealed space
246 . . . Upper space
247 . . . Lower space
248 . . . Groove
249 . . . Opening
25 . . . Shield
251 . . . Groove
252 . . . Opening
26 . . . Radio wave absorber
27 . . . Vacuum pump
30A, 30B, 30D . . . Test antenna
31,31B . . . substrate
311 . . . Upper surface
312 . . . Lower surface
32a, 32b . . . Radiating element
33,33D . . . First wiring pattern
34 . . . Detector
35, 35D . . . Second wiring pattern
36 . . . Pogo pin
37 . . . Shield
38 . . . Third wiring pattern
40, 40b . . . Attenuation member
41 . . . Fixing member
42 . . . Through hole
5 . . . Tester
51 . . . Main frame
511 . . . Cable
52 . . . Test head
60A, 60B . . . Socket
61A, 61B . . . Socket body
62 . . . Contactor
63 . . . Mounting surface
64 . . . Latch
65 . . . Socket cover
66 . . . Cover body
661 . . . Top plate
661a . . . Flange portion
662 . . . Side wall
663 . . . Outer surface
664 . . . Concavity
67 . . . Pusher
67a . . . Lower end
671 . . . Groove
672 . . . Opening
70 . . . Load board
71 . . . Pad
10A, 10B . . . Electronic component (DUT)
11A,11B . . . Substrate
12a, 12b . . . Device antenna
13 . . . Semiconductor chip
14 . . . Input and output terminals

What is claimed is:

1. An electronic component handling apparatus comprising:
a moving device that:
moves a device under test (DUT) comprising a first antenna and presses the DUT against a socket, and comprises:
a holder that holds the DUT; and
a second antenna comprising a radiating element that receives a radio wave radiated from the first antenna or radiates the radio wave to the first antenna, wherein
the holder:
is interposed between the first antenna and the second antenna, and
comprises:
an attenuation plate that attenuates the radio wave radiated from the first or the second antenna, and a tubular portion that surrounds the radiating element and has an opening facing the DUT, wherein
the attenuation plate is disposed inside the tubular portion and faces the radiating element.

2. The electronic component handling apparatus according to claim 1, wherein the tubular portion contacts the DUT and surrounds the first antenna.

3. The electronic component handling apparatus according to claim 1, wherein
the holder comprises:
a first connector that:
is connected to the second antenna,
transmits a radio wave or an electrical signal to the second antenna, and
connects to a second connector of a tester when the moving device presses the DUT against the socket.

4. The electronic component handling apparatus according to claim 3, wherein
the holder further comprises:
a detector that is interposed between the second antenna and the first connector and converts an RF signal into a DC signal.

5. The electronic component handling apparatus according to claim 1, wherein
the second antenna is a patch antenna comprising:
a substrate;
a radiating element disposed on the substrate; and
a wiring pattern disposed on the substrate and connected to the radiating element.

6. The electronic component testing apparatus comprising:
the electronic component handling apparatus according to claim 1; and
a tester comprising:
a test head to which the socket is mounted, wherein
the holder comprises:
a first connector that is connected to the second antenna and transmits a radio wave or an electrical signal to the second antenna,
the tester further comprises:
a second connector connected to the first connector, and
the tester tests the DUT by transmitting and receiving the radio wave between the first antenna and the second antenna in a state where the DUT is electrically connected to the socket and the first connector and the second connector are connected to each other.

7. An electronic component handling apparatus comprising:
a moving device that:
moves a device under test (DUT) comprising a first antenna and presses the DUT against a socket, and comprises:
a holder that holds the DUT; and
a second antenna that receives a radio wave radiated from the first antenna or radiates the radio wave to the first antenna, wherein
the holder:
is interposed between the first antenna and the second antenna, and comprises:
an attenuation plate that attenuates the radio wave radiated from the first or the second antenna,
the second antenna comprises:
a radiating element that receives the radio wave radiated from the first antenna or radiates the radio wave to the first antenna,
the holder further comprises:
a chuck body that has a concavity; and
a tubular portion that is attached to the chuck body, has an opening facing the DUT, and surrounds the concavity,
the radiating element is disposed in the concavity, and
the attenuation plate is disposed in the concavity and faces the radiating element.

8. An electronic component testing apparatus comprising:
a tester that comprises:
a test head electrically connected to the tester; and
a socket mounted on the test head, wherein
the socket comprises:
a socket body that:
is mounted on the test head, and
comprises a contactor electrically connected to a device under test (DUT) comprising a first antenna; and
a socket cover that covers the socket body and presses the DUT against the socket body,
the socket cover comprises:
a second antenna that faces the socket body and that comprises a radiating element receiving a radio wave radiated from the first antenna or radiating the radio wave to the first antenna; and
a first connector that is connected to the second antenna and transmits a radio wave or an electrical signal to the second antenna,
the tester further comprises:
a second connector that connects to the first connector,
the tester tests the DUT by transmitting and receiving the radio wave between the first antenna and the second antenna in a state where the DUT is electrically connected to the socket and the first connector and the second connector are connected to each other,
the socket cover further comprises:
an attenuation plate that is interposed between the first antenna and the second antenna and attenuates the radio wave radiated from the first or second antenna; and
a tubular portion that surrounds the radiating element and has an opening facing the DUT,
the tubular portion contacts the DUT and surrounds the first antenna, and
the attenuation plate is disposed inside the tubular portion and faces the radiating element.

9. A socket electrically connected to a device under test (DUT) comprising a first antenna, the socket comprising:
a socket body that comprises:
a contactor electrically connected to the DUT; and
a socket cover that:
covers the socket body and presses the DUT against the socket body, and comprises:
a second antenna that faces the socket body and comprises a radiating element receiving the radio wave radiated from the first antenna or radiating the radio wave to the first antenna,
the socket cover further comprises:
an attenuation plate that is interposed between the first antenna and the second antenna and attenuates the radio wave radiated from the first or second antenna; and
a tubular portion that surrounds the radiating element and has an opening facing the DUT and,
the tubular portion contacts the DUT and surrounds the first antenna, and
the attenuation plate is disposed inside the tubular portion and faces the radiating element.

10. The socket according to claim 9, wherein
the socket cover further comprises:
- a first connector that is connected to the second antenna and transmits a radio wave or an electrical signal to the second antenna, and
- the first connector that is connected to a second connector of a tester when the socket cover presses the DUT against the socket.

11. The socket according to claim 10, wherein
the socket cover further comprises:
- a detector that is interposed between the second antenna and the first connector and converts a RF signal into a DC signal.

12. The socket according to claim 9, wherein
the second antenna is a patch antenna comprising:
- a substrate;
- a radiating element disposed on the substrate; and
- a wiring pattern disposed on the substrate and connected to the radiating element.

* * * * *